US008646805B2

(12) United States Patent
Goldszer

(10) Patent No.: US 8,646,805 B2
(45) Date of Patent: Feb. 11, 2014

(54) LIGHT DUTY CART

(75) Inventor: Jacob Goldszer, Weston, FL (US)

(73) Assignee: JGR Copa, LLC, Hollywood, FL (US)

(*) Notice: Subject to any disclaimer, the term of this patent is extended or adjusted under 35 U.S.C. 154(b) by 128 days.

(21) Appl. No.: 13/097,431

(22) Filed: Apr. 29, 2011

(65) Prior Publication Data

US 2012/0104730 A1    May 3, 2012

Related U.S. Application Data

(60) Provisional application No. 61/409,570, filed on Nov. 3, 2010.

(51) Int. Cl.
| B62B 5/00 | (2006.01) |
| B62B 1/12 | (2006.01) |
| B62B 1/00 | (2006.01) |
| A47B 3/10 | (2006.01) |
| A47B 3/08 | (2006.01) |

(52) U.S. Cl.
CPC . *B62B 1/12* (2013.01); *B62B 1/008* (2013.01); *B62B 2206/006* (2013.01); *A47B 3/10* (2013.01); *A47B 3/08* (2013.01)
USPC ............................................. 280/651; 280/30

(58) Field of Classification Search
CPC ........ A47B 3/0818; A47B 31/04; A47B 3/10; B60B 33/0042; B25H 1/04; B62B 3/02; B62B 2205/00; B62B 2205/30; B62B 1/12
USPC ................... 280/651, 659, 652, 654, 30, 655; 108/132
See application file for complete search history.

(56) References Cited

U.S. PATENT DOCUMENTS

| 1,718,962 | A | * | 7/1929 | Kimball ........................ 280/655 |
| D180,868 | S | * | 8/1957 | Diehl ............................. D34/24 |
| 3,191,958 | A | | 6/1965 | Smith |
| 3,627,342 | A | | 12/1971 | Morellet |
| 3,677,571 | A | | 7/1972 | Maturo, Jr. et al. |
| 3,693,993 | A | | 9/1972 | Mazzarelli et al. |
| 4,055,357 | A | | 10/1977 | Sorocin |
| 4,222,585 | A | | 9/1980 | Crothers |
| 4,248,453 | A | * | 2/1981 | Stark ............................. 280/655 |
| 4,266,807 | A | | 5/1981 | Griffin |
| 4,355,818 | A | * | 10/1982 | Watts ............................ 280/654 |
| 4,362,307 | A | * | 12/1982 | Nakatani ........................ 280/30 |
| 4,429,897 | A | | 2/1984 | Friedman et al. |
| 4,586,721 | A | * | 5/1986 | Harada et al. ................... 280/30 |
| 4,703,944 | A | | 11/1987 | Higson |

(Continued)

*Primary Examiner* — J. Allen Shriver, II
*Assistant Examiner* — Brian Cassidy
(74) *Attorney, Agent, or Firm* — Robert C. Kain, Jr.

(57) ABSTRACT

A cart includes foldable upper and lower frame members. In some arrangements, the cart can also double as a table. The cart includes a main-frame structure, an upper framework pivotally attached to an upper portion of the main-frame, and a lower frame stand pivotally attached to a bottom portion of the main-frame. A panel is provided in the cart space defined by the side members of the main-frame structure. The cart stands upright when the main-frame is in a vertical position with respect to the surface of the ground and the lower frame stand is extended with respect to the main-frame. The cart can function as a table when the main-frame is positioned horizontally with respect to the surface of the ground and the upper framework and the lower frame stand are extended with respect to the main-frame.

17 Claims, 9 Drawing Sheets

(56) References Cited

U.S. PATENT DOCUMENTS

| | | | |
|---|---|---|---|
| 4,790,559 A | 12/1988 | Edmonds | |
| 4,865,346 A | 9/1989 | Carlile | |
| 4,887,837 A | 12/1989 | Bonewicz, Jr. et al. | |
| 5,056,804 A * | 10/1991 | Wilson et al. | 280/30 |
| 5,197,754 A | 3/1993 | Ward | |
| 5,542,639 A * | 8/1996 | Wixey et al. | 248/439 |
| 5,636,852 A * | 6/1997 | Sistrunk et al. | 280/30 |
| 5,642,895 A * | 7/1997 | Wunder | 280/30 |
| 5,915,722 A | 6/1999 | Thrasher et al. | |
| 5,988,671 A | 11/1999 | Abelbeck et al. | |
| 6,000,713 A * | 12/1999 | Lin | 280/647 |
| 6,375,200 B1 * | 4/2002 | Harter | 280/30 |
| 6,520,574 B1 * | 2/2003 | Huang | 297/184.16 |
| 6,880,851 B1 * | 4/2005 | Summers et al. | 280/652 |
| D599,972 S | 9/2009 | Goldszer | |
| 7,988,120 B2 * | 8/2011 | Hsu | 248/439 |
| 8,182,030 B1 * | 5/2012 | Britten | 297/129 |
| 2008/0061524 A1 | 3/2008 | Goldszer | |

* cited by examiner

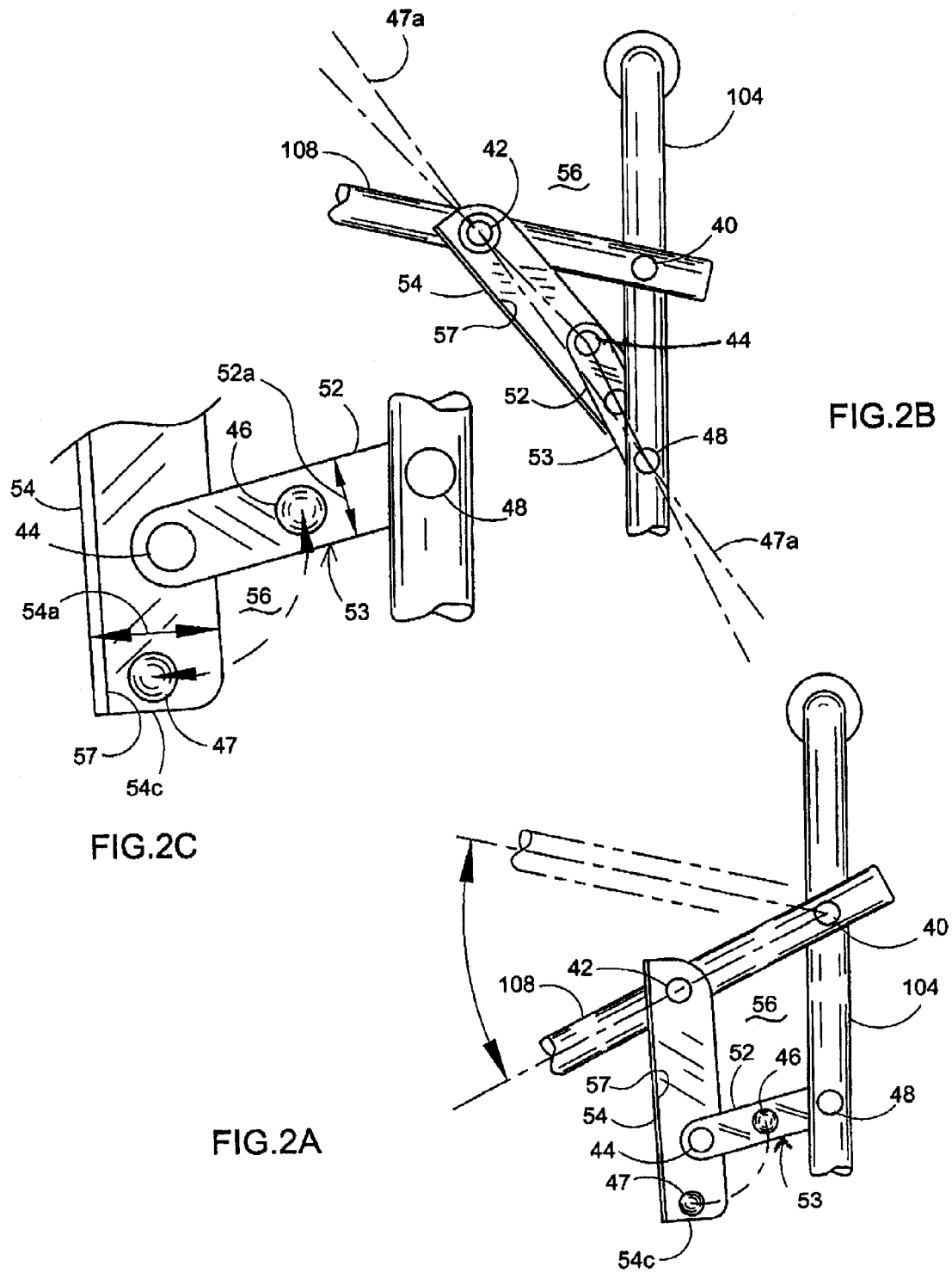

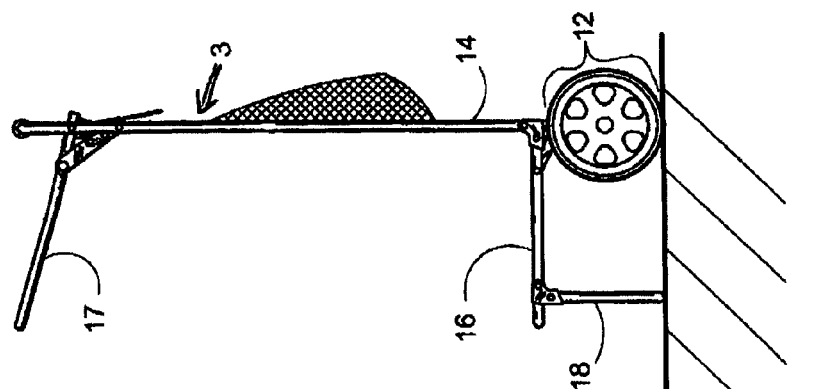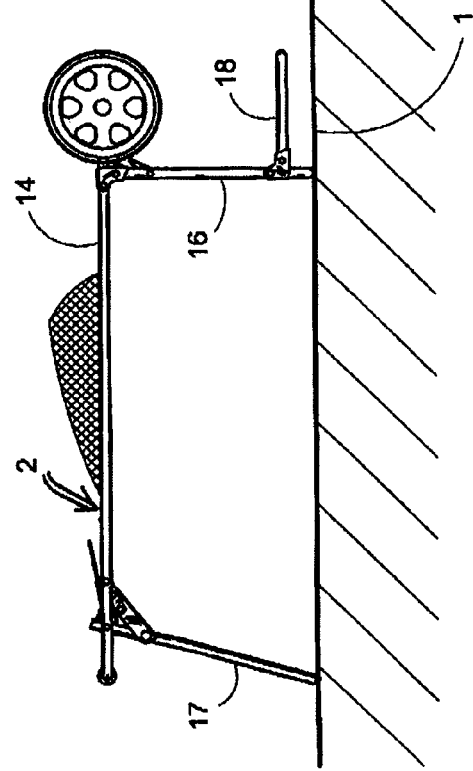

LIGHT DUTY CART

CROSS-REFERENCE TO RELATED APPLICATIONS

This application claims the benefit of Provisional Patent Application No. 61/409,570, filed Nov. 3, 2010.

INCORPORATION BY REFERENCE

The entire contents of Provisional Patent Application No. 61/409,570 is incorporated by reference herein and made a part of the present disclosure.

BACKGROUND OF THE INVENTION

1. Field of the Invention

The present invention relates to a utility cart with foldable frame members that can be used to carry items, such as beach chairs, coolers, towels, blankets, and food stuffs.

2. Description of the Related Art

Certain types of carts are known which collapse into a compact shape such that the cart can be stowed in the trunk of an automobile and carried reasonable distances and, with some ease, opened up such that the wheeled cart can carry beach towels, chairs, a cooler, blankets and other items commonly used by persons.

Examples of collapsible carts are disclosed in: U.S. Pat. Nos. 3,191,958; 3,627,342; 3,677,571; 3,693,993; 4,055,357; 4,222,585; 4,266,807; 4,429,897; 4,703,944; 4,790,559; 4,865,346; 4,887,837; and 5,197,754. Other carts are disclosed in U.S. Pat. No. 5,915,722 to Thrasher and U.S. Pat. No. 5,988,671 to Abelback wherein the beach cart is collapsible, but the lower frame of these beach carts are hinged to the forward legs and the rear legs. Still, a need exists for collapsible carts that provide improved layouts to allow a more efficient use of the available space, so that the carrying capacity of the cart can be optimized. In addition, a need exists for carts with improved and/or dedicated structures for carrying specific, commonly-used items.

SUMMARY OF THE INVENTION

Certain embodiments of the present light duty cart include foldable or collapsible frame members that can easily be folded into a compact structure and stowed in a trunk of a car and, in another mode, unfolded such that the frame can hold items, such as beach chairs and coolers. In some arrangements, a table is provided for placing items onto when the frame members are in the extended or unfolded mode. In still other arrangements, one or more foldable arms can be provided with locking systems to securely support the frame members in the extended or unfolded mode.

Some embodiments of the foldable light duty cart are adapted to carry items such as beach chairs, coolers, towels, blankets and food stuffs. The cart can include a main-frame structure including opposing rigid main-frame side frame members and at least one cross bar member extending between the main-frame side frame members. Wheels are rotatably mounted near the bottom portions of the main-frame side members such that when the cart stands up, the lower frame elements act as a stand system. Preferably, each of the pair of wheels is rotatably mounted near a terminal bottom end of each of the main-frame side frame members.

In some arrangements, a panel is attached between the main-frame side members. The panel covers a portion of the rectangular enclosed the cart space formed by the main-frame members. The panel may be cloth (e.g., nylon), a rigid panel, or a flexible panel.

In some arrangements, a pivotally mounted upper framework is coupled to the upper portions of the main-frame side members. The upper framework includes opposing rigid upper framework side frame elements and at least one rigid upper framework cross bar element extending between the upper framework side elements. A lower frame stand can be pivotally attached to lower portions of the main-frame side members. The lower frame stand can include first and second frame stand segments. Preferably, the first frame stand segment is pivotally attached to lower portions of the main-frame side members. The first frame stand segment can include opposing rigid first frame stand side supports and at least one first frame stand cross bar support extending therebetween. The terminal ends of the first frame stand side supports can be pivotally attached to the lower portions of the main-frame side members. Preferably, the first frame stand segment has a collapsed position and a fully extended position. In its fully extended position, preferably, the first frame stand segment is generally perpendicular to the plane of the main-frame structure. In its collapsed position, preferably, the first frame stand side supports are substantially adjacent to or near the main-frame side members.

In some arrangements, the second frame stand segment is pivotally attached to the first frame stand segment. When fully extended, preferably, the second frame stand segment forms a generally L-shaped stand with the first frame stand segment. The second frame stand segment includes at least opposing rigid second frame stand legs. The terminal ends of the second frame stand legs can be pivotally attached to the first frame stand side supports. The second frame stand segment has a collapsed position and a fully extended position. In its fully extended position, the second frame stand segment is generally perpendicular to the plane of the first frame stand segment forming the L-shape. In its collapsed position, preferably, the second frame stand segment and the second frame stand side legs are adjacent to or near the second frame stand segment side supports.

In some embodiments, the cart includes a lower swivel lock that pivotally connects the main-frame structure to the first frame stand segment. The lower swivel lock can have a body, a frame channel, and channel side walls. The lower swivel channel side walls are pivotally attached to one of the main-frame side members. The lower swivel body is attached to the terminal end adjacent the first frame stand side support. The lower swivel frame channel captures the main-frame side member therein when the lower frame stand segment and the first frame stand segment are substantially perpendicular to the main-frame side member in a fully extended position. When the main-frame side member is not captured in the lower swivel frame channel, the lower frame stand is permitted to swing to a collapsed position near the main-frame side member. The lower swivel channel may also have at least one lower swivel detent therein to capture and lock the main-frame side member in the frame channel when in the fully extended position.

Certain embodiments of the light duty cart also include a stand swivel lock that pivotally connects the first frame stand segment to the second frame stand segment. The stand swivel lock can have a body, a frame channel, and channel side walls. Preferably, the stand swivel channel side walls are pivotally attached to one of the first frame stand side supports. The stand swivel body is attached to the terminal end of an adjacent second frame stand side leg. The stand swivel frame channel captures the first frame stand side support therein when the first frame stand segment is substantially perpendicular to the second frame stand segment and in an extended position. When the first frame stand side support is not captured in the stand swivel frame channel, the second frame stand segment is permitted to swing to a collapsed position adjacent to the second frame stand segment. The stand swivel channel may also have at least one lower swivel detent therein to capture and lock the second frame stand segment when in the extended position.

In some embodiments, the light duty cart can also include a lower swing arm safety latch system between one of the first frame stand side supports and an adjacent main-frame side member. The lower swing arm safety latch system has a swing arm with a catch mouth or opening at one end thereof and the other end thereof pivotally mounted to one of the first frame stand side supports. The latch system also includes a pin on the adjacent main-frame side member at a location such that upon rotation of the swing arm, the catch mouth or opening accepts and retains the pin therein. The swing arm latches the first frame stand to the main-frame to maintain the first frame stand in an extended position with respect to the main-frame.

In some embodiments, the light duty cart can also include an off center swing hinge lock system between one of the main-frame side members and an adjacent upper framework side element. The lock prohibits unintentional closure or collapse of the framework from its extended position with respect to the plane of the main-frame. The off center swing hinge lock system can include a first hinge arm and a second hinge arm, which arms can be pivotally connected and each arm is otherwise respectively pivotally coupled to the upper framework side element and the main-frame side member. The first and second hinge arms are pivotally attached to each other at an arm pivot point. The first hinge arm includes a stop or lip and the second hinge arm has an edge co-acting with the lip stop. When the first and second hinge arms are fully extended they are generally linearly aligned with respect to each other but are further over-extended beyond the longitudinal centerline of each arm. When in the fully extended position, the arm pivot point linking both hinge arms is inboard with respect to an imaginary line through the pivotal coupling attaching the first hinge arm and the upper framework side element and the pivotal coupling attaching the second hinge arm and the main-frame side member.

An embodiment involves a foldable light duty cart adapted to carry items such as beach chairs, coolers, towels, blankets and food stuffs. The cart includes a main-frame structure, including opposing rigid main-frame side frame members with at least one rigid main-frame cross bar member spanning the main-frame side members. A wheel system is rotatably mounted near bottom portions of the main-frame side members. A panel is attached between the main-frame side members. A pivotally mounted upper framework is pivotally attached to the main-frame side members, including opposing rigid upper framework side frame elements and at least one rigid upper framework cross bar element spanning the upper framework side elements. A pivotally mounted lower frame stand is pivotally attached to the main-frame side members. The lower frame stand has first and second frame stand segments. The first frame stand segment is pivotally attached to the main-frame side members. The first frame stand segment includes opposing rigid first frame stand side supports and at least one first frame stand cross bar support therebetween. The second frame stand segment is pivotally attached to the first frame stand segment at the first frame stand side supports. The second frame stand segment includes opposing rigid second frame stand legs. A lower swivel lock has body, a frame channel and channel side walls. The lower swivel channel side walls pivotally attached to one of the main-frame side members and the lower swivel body is attached to an adjacent first frame stand side support. The lower swivel frame channel captures the main-frame side member therein when the lower frame stand and the first frame stand segment is substantially perpendicular to the main-frame side member in an extended position. When the main-frame side member is not captured in the lower swivel frame channel, the lower frame stand is adapted to swing to a collapsed position near the main-frame side member. The lower swivel frame channel has at least one lower swivel detent therein to capture and lock the main-frame side member when in the fully extended position. A stand swivel lock has a body, a frame channel and channel side walls. The stand swivel channel side walls pivotally attach to one of the first frame stand side supports and the stand swivel body is attached to an adjacent second frame stand leg. The stand swivel frame channel captures the first frame stand side support therein when the second frame stand segment is substantially perpendicular to the first frame stand side support and in an extended cart-standing position. When the first frame stand side support is not captured in the stand swivel frame channel, the second frame stand segment is adapted to swing to a collapsed position. The stand swivel frame channel has at least one stand swivel detent therein to capture and lock the first frame stand side support when in the extended position. An off center swing hinge lock system is provided between one of the main-frame side members and an adjacent upper framework side element. A lower swing arm safety latch system is provided between one of the first frame stand side supports and an adjacent main-frame side member. The lower swing arm latch has a swing arm with a catch mouth at one end thereof and the other end thereof pivotally mounted to the one of the first frame stand side supports. A pin is provided on the adjacent main-frame side member at a location such that upon rotation of the swing arm, the catch mouth accepts and retains the pin therein and the lower swing arm latches the first frame stand to the main-frame to maintain the first frame stand in the extended position with respect to the main-frame.

An embodiment involves a foldable light duty cart adapted to carry items such as beach chairs, coolers, towels, blankets and food stuffs comprising: a main-frame structure including opposing rigid main-frame side frame members with at least one rigid main-frame cross bar member spanning the main-frame side members; a wheel system rotatably mounted near bottom portions of the main-frame side members; a panel attached between the main-frame side members; a pivotally mounted upper framework which is pivotally attached to the main-frame side members, including opposing rigid upper framework side frame elements and at least one rigid upper framework cross bar element spanning the upper framework side elements; a pivotally mounted lower frame stand which is pivotally attached to the main-frame side members, the lower frame stand having first and second frame stand segments; the first frame stand segment pivotally attached to the main-frame side members, including opposing rigid first frame stand side supports and at least one first frame stand cross bar support therebetween; the second frame stand segment pivotally attached to the first frame stand segment at the first frame stand side supports, the second frame stand segment including opposing rigid second frame stand legs; a lower swivel lock having body, a frame channel and channel side walls, the lower swivel channel side walls pivotally attached to one of the main-frame side members and the lower swivel body attached to an adjacent first frame stand side support, the lower swivel frame channel capturing the main-frame side member therein when the lower frame stand and the first frame stand segment is substantially perpendicular to the main-frame side member in a fully extended position, and, when the main-frame side member is not captured in the lower swivel frame channel, the lower frame stand is adapted to swing to a collapsed position near the main-frame side member; a stand swivel lock having a body, a frame channel and channel side walls, the stand swivel channel side walls pivotally attached to one of the first frame stand side supports and the stand swivel body attached to an adjacent second frame stand leg, the stand swivel frame channel capturing the first frame stand side support therein when the second frame stand segment is substantially perpendicular to the first frame stand side support and in a fully extended cart-standing position, and, when the first frame stand side support is not captured in the stand swivel frame channel, the second frame stand segment is adapted to swing to a collapsed position; an off center swing hinge lock system between one of the main-frame side members and an adjacent upper framework side element; a lower swing arm safety latch system between one of the first frame stand side supports and an adjacent main-frame side member, the lower swing arm latch having a swing arm with a catch mouth at one end thereof and the other end thereof pivotally mounted to the one of the first frame stand side supports, a pin on the adjacent main-frame side member at a location such that upon rotation of the swing arm, the catch mouth accepts and retains the pin therein and the lower swing arm latches the first frame stand to the main-frame to maintain the first frame stand in the fully extended position with respect to the main-frame, the off center swing hinge lock system includes a first hinge arm and a second hinge arm respectively pivotally coupled to the upper framework side element and the main-frame side member, the first and second hinge arms pivotally attached to each other at an arm pivot point, the first hinge arm having a stop and the second hinge arm having an edge, the stop coacting with the edge and forming an off center hinge lock when the first and second hinge arms are fully extended in a locked position and the arm pivot point being inboard with respect to an imaginary line through the pivotal coupling of the first hinge arm and the upper framework side element and the pivotal coupling of the second hinge arm and the main-frame side member.

An embodiment involves a foldable light duty cart adapted to carry items such as beach chairs, coolers, towels, blankets and food stuffs comprising: a main-frame structure including opposing rigid main-frame side frame members with at least one rigid main-frame cross bar member spanning the main-frame side members; a wheel system rotatably mounted near bottom portions of the main-frame side members; a pivotally mounted upper framework which is pivotally attached to the main-frame side members, including opposing rigid upper framework side frame elements and at least one rigid upper framework cross bar element spanning the upper framework side elements; a pivotally mounted lower frame stand which is pivotally attached to the main-frame side members, the lower frame stand having first and second frame stand segments; the first frame stand segment pivotally attached to the main-frame side members, including opposing rigid first frame stand side supports and at least one first frame stand cross bar support therebetween; the second frame stand segment pivotally attached to the first frame stand segment at the first frame stand side supports, the second frame stand segment including opposing rigid second frame stand legs; a lower swivel lock having body, a frame channel and channel side walls, the lower swivel channel side walls pivotally attached to one of the main-frame side members and the lower swivel body attached to an adjacent first frame stand side support, the lower swivel frame channel capturing the main-frame side member therein when the lower frame stand and the first frame stand segment is substantially perpendicular to the main-frame side member in a fully extended position, and, when the main-frame side member is not captured in the lower swivel frame channel, the lower frame stand is adapted to swing to a collapsed position near the main-frame side member, the lower swivel frame channel having at least one detent therein to capture and lock the main-frame side member when in the fully extended position; a stand swivel lock having a body, a frame channel and channel side walls, the stand swivel channel side walls pivotally attached to one of the first frame stand side supports and the stand swivel body attached to an adjacent second frame stand leg, the stand swivel frame channel capturing the first frame stand side support therein when the second frame stand segment is substantially perpendicular to the first frame stand side support and in a fully extended cart-standing position, and, when the first frame stand side support is not captured in the stand swivel frame channel, the second frame stand segment is adapted to swing to a collapsed position, the stand swivel frame channel having at least one detent therein to capture and lock the first frame stand side support when in the fully extended position; an off center swing hinge lock system between one of the main-frame side members and an adjacent upper framework side element; a lower swing arm safety latch system between one of the first frame stand side supports and an adjacent main-frame side member, the lower swing arm latch having a swing arm with a catch mouth at one end thereof and the other end thereof pivotally mounted to the one of the first frame stand side supports, a pin on the adjacent main-frame side member at a location such that upon rotation of the swing arm, the catch mouth accepts and retains the pin therein and the lower swing arm latches the first frame stand to the main-frame to maintain the first frame stand in the fully extended position with respect to the main-frame.

A preferred embodiment involves a light duty cart having a frame, which includes a substantially planar main-frame portion that extends in a generally vertical direction when the cart is in an upright position. A handle is located at an upper portion of the main-frame portion and a wheelset is located at a lower portion of the main-frame portion. An upper foldable frame portion, which is pivotally mounted to the upper portion of the main-frame portion, has an unfolded position. In the unfolded position, the upper foldable frame portion is generally perpendicular to the main-frame portion. The upper foldable frame portion is movable from the unfolded position toward the main-frame portion. At least one upper locking mechanism selectively locks the upper foldable frame portion in the unfolded position. The locking mechanism includes a first lock arm and a second lock arm. The first lock arm is pivotally coupled to the main-frame portion at a first pivot and the second lock arm is pivotally coupled to the upper foldable frame portion at a second pivot. The first lock arm and the second lock arm are coupled to one another at an arm pivot. The first lock arm and the second lock arm fold about the arm pivot in a first direction to permit the upper foldable arm to move from the unfolded position toward the main-frame portion. The first lock arm and the second lock arm fold about the arm pivot in a second direction to a locked position, wherein arm pivot is spaced from a line passing through the first pivot and the second pivot in the locked position. The locking mechanism includes a stop that prevents the first lock arm and the second lock arm from folding in the second direction beyond the locked position.

In some arrangements, the wheelset includes a first pair of individual wheels on a first lateral side of the main-frame portion and a second pair of individual wheels on a second lateral side of the main-frame portion opposite the first side. Preferably, each of the first pair of individual wheels and the second pair of individual wheels are rotatable about a single axis of rotation. The cart can also include an umbrella holder supported by the main-frame portion, the umbrella holder can include a lower pocket and at least one strap spaced above, and generally aligned with, an open upper end of the lower pocket.

In some arrangements, the cart also includes a lower foldable frame portion, which is pivotally mounted to the lower portion of the main-frame portion and has an unfolded position. In the unfolded position, the lower foldable frame portion is generally perpendicular to the main-frame portion. The lower foldable frame portion is movable from the unfolded position toward the main-frame portion, and a lower locking mechanism selectively locks the lower foldable frame portion in the unfolded position. The cart preferably includes a generally open space between the upper foldable frame portion and the lower foldable frame portion, which is substantially free of any elements of the frame of the cart, such that hanging items can be supported by the upper foldable frame portion and occupy a portion of the open space. The cart can also include a lower extension that is foldably coupled to the lower foldable frame portion and movable between an unfolded position and a folded position relative to the lower foldable frame portion. The lower extension defines a support panel capable of supporting items thereon when the lower extension is in the unfolded position. The lower extension can extend outwardly from the lower foldable frame portion in a direction away from the main-frame portion in the unfolded position.

The cart can also include a panel supported by the main-frame portion and extending along a substantial length of the main-frame portion. The panel can be sufficiently rigid to permit use as a table top when the cart is used in a table mode, in which the panel is oriented in a generally horizontal direction. In some arrangements, the upper foldable frame portion and the lower foldable frame portion include respective upper and lower frame stands that are of a substantially similar U-shaped construction such that the upper and lower foldable frame portions can act as support legs when the cart is used in the table mode. The cart can include a cooler unit that is supported by the lower foldable frame portion. The cooler unit can be removable from the cart. The cart can include a container supported by the cart above the cooler unit. An upper end of the container can be located proximate the upper foldable frame portion.

BRIEF DESCRIPTION OF THE DRAWINGS

These and other features, aspects and advantages of the light duty cart are described herein with reference to drawings of preferred embodiments, which are intended to illustrate but not to limit the invention. The drawings contain thirteen (13) figures.

FIG. 2A is a side view of a portion of the cart of FIG. 1 illustrating an off center swing hinge lock system for securing the upper framework in the extended position. In FIG. 2A, the upper framework is in a partially collapsed position and the lock system is in an unlocked position.

FIG. 2B is a side view of the off center swing hinge lock system of FIG. 2A illustrating the first and second hinge arms in an off-center locked position.

FIG. 2C is an enlarged side view of a portion of the off center swing hinge lock system of FIGS. 2A and 2B, highlighting the detents on the hinge.

FIG. 5A is a side view of the cart of FIG. 1 in an orientation in which it can be utilized as a table.

FIG. 5B is a side view of the cart of FIG. 1 in an upright position, in which it can be utilized as a cart.

DETAILED DESCRIPTION OF THE PREFERRED EMBODIMENTS

Figure 1:
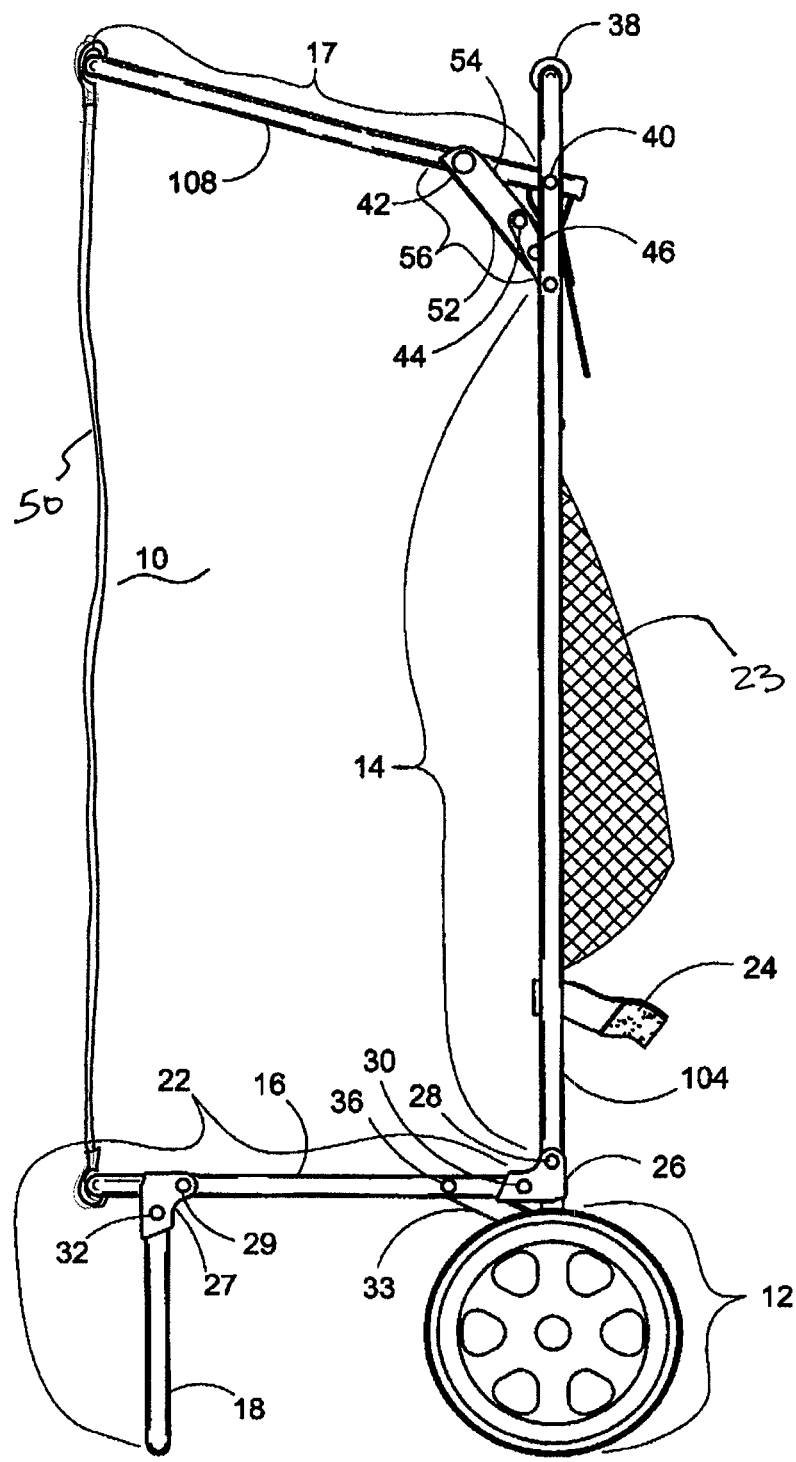
FIG. 1 is a side view of the light duty cart in an upright position. An upper framework is in an extended and locked position with respect to the main frame. Similarly, a lower framework stand is in an extended and locked position with respect to the main frame.

Preferred embodiments relate to a cart with collapsible or foldable frame members. The cart can be used to carry items such as beach chairs, coolers, towels, blankets and food stuffs. In certain preferred embodiments, the frame is constructed such that the cart can also be used as a table. Preferred embodiments of the cart are disclosed herein with reference to multiple drawings. The drawings are not necessarily to scale and the specific arrangements are provided as examples of possible constructions. For convenience, the cart may be described using relative terms, such as up, down, left, right, above, below, forward, rearward an other similar terms. In general, unless stated otherwise, these terms are used in accordance with their ordinary meaning and are used relative to the cart as it is oriented in the referenced figure(s). In other words, the relative terminology used may not be applicable in all possible orientations or configurations of the cart or its components.

FIGS. 1-6 illustrate embodiments of a light duty cart, which is referred to generally by the reference numeral 10. Similar numbers designate the same or corresponding items throughout the drawings. The cart 10 has a frame that includes a main-frame structure 14 that can be made from several main-frame members or struts. Other suitable arrangements for the main-frame structure 14 can also be used.

Figure 6:
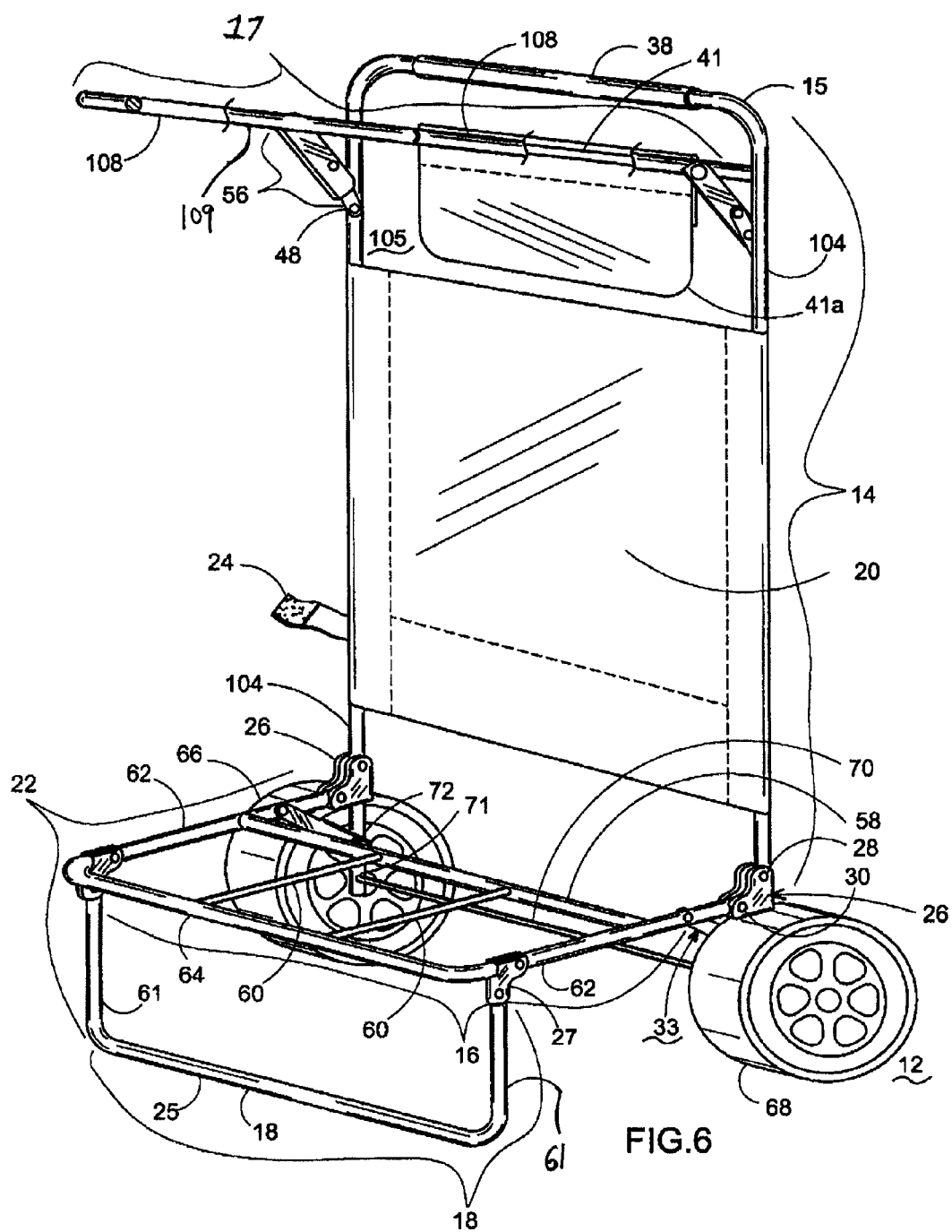
FIG. 6 is a perspective view of the cart of FIG. 1.

In the illustrated arrangement, the main-frame structure 14 includes two opposing rigid main-frame side frame members 104 and a rigid main-frame cross bar frame member 15 extending between the main-frame side frame members 104 (see FIG. 6). The frames and framework elements can be bars, tubes or rods having various different cross-sectional shapes (round, square, oval, etc.) and sizes, including shapes and sizes different than those shown in the drawings. Furthermore, in an embodiment, the frame sections are fabricated from tubular metal, such as steel, aluminum or other metallic materials. However, other materials, such as plastic or composites, could also be used. In the illustrated arrangement, the main-frame cross bar frame member 15 and the main-frame side frame members 104 are of a unitary construction (i.e., constructed from a single piece of material).

In an embodiment, the main-frame 14 can be generally U-shaped, wherein the cross bar member 15 is formed at the terminal ends of the opposing rigid side frame members 104. Thus, the main-frame 14 generally defines the shape of the letter U (an inverted U in the illustrated arrangement). In another embodiment, the main-frame 14 can generally define the shape of the letter H or can include multiple cross bars which define a rectangle or square cart space 105.

The main-frame side members 104 and the main-frame cross member 15 partially define or enclose a cart space 105. In the illustrated arrangement, a rectangular cart space 105 is defined by frame rails 104 and end cross piece or rail 15. A panel 20 partly covers the cart space 105 and is described further below with reference to FIG. 6.

The cart 10 includes a wheel system 12 near the lower portion of the main-frame side frame members 104. As further described below with reference to FIG. 6, the wheel system 12 preferably includes a pair of wheels spaced on either side of the cart 10 and rotatable relative to the main-frame 14.

A foldable upper framework 17 is coupled near the upper portion of the main-frame 14. Preferably, the upper framework 17 is coupled to the main-frame side members 104. The upper framework 17 preferably defines a U-shape, and may be of a unitary construction from similar materials and construction techniques as the main-frame 14. Preferably, the free ends of the upper framework 17 are coupled to the main-frame 14 and can be extended or unfolded (as shown in FIG. 1) to a generally perpendicular position or can be folded into a collapsed position (not completely shown, but see FIG. 2A) with respect to the main-frame structure 14. Preferably, in the folded or collapsed position, the framework side elements 108 of the upper framework 17 can be positioned in a generally or substantially side-by-side arrangement with the side frame members 104 such that the main-frame 14 and the upper framework 17 are generally or substantially co-planar. Such an arrangement provides a thin profile (in the depth direction) in the folded position of the cart 10.

FIG. 2A illustrates the framework side elements 108 in a partially collapsed position relative to the main-frame 14. As described above, when in the collapsed position, the upper framework 17 preferably is adjacent to or coplanar with the main-frame 14. When the upper framework 17 is in the extended position (see FIG. 1), the framework 17 protrudes generally perpendicular from the plane of the main-frame 14; however, preferably, the upper framework 17 is angled with its outward or unsupported end slightly upward from perpendicular to allow gravity to assist in urging keeping items placed over the framework 17 toward the main-frame 14 when the cart 10 is upright or generally upright. In addition, in the extended position, the upper framework 17 can be used as one of the table supports such that the cart can be used as a table (see FIG. 5A).

Preferably, a locking mechanism is provided to selectively secure the upper framework 17 in the unfolded or extended position relative to the main-frame 14. In the illustrated arrangement, the locking mechanism is an off center swing hinge lock system 56 that is capable of securing the upper framework 17 in the extended position with respect to main-frame structure 14. See detail in FIG. 2B. When the framework 17 is fully extended, and the off center swing hinge lock system engaged, the framework 17 preferably is securely locked with respect to the main-frame structure 14 and does not move or collapse when longitudinal forces generally parallel to longitudinal direction of the main-frame 14 act upon framework 17. These forces are generally normal to the framework 17 plane. The off center swing hinge lock system 56 prohibits unintentional closure or collapse of the framework 17 from the extended position. The hinge lock system 56 preferably includes a first hinge arm 54 and a second hinge arm 52 and is described further below with reference to FIGS. 2A, 2B, 2C.

A lower frame stand 22 is pivotally coupled near the lower portion of the main-frame structure 14. The lower frame stand 22 preferably includes a first frame stand segment 16 and a second frame stand segment 18. When the cart 10 is standing in an upright position (FIG. 1), the lower frame stand 22 can be unfolded or extended relative to main frame members 104. Preferably, when the lower frame stand 22 is extended, the first frame stand segment 16 is generally or substantially perpendicular to the main-frame 14, and the second frame stand segment 18 is generally or substantially perpendicular to the first frame stand segment 16. Thus, preferably, segment 18 generally or substantially parallel to main frame rails 104, and extends downwardly from the first frame stand segment 16. When the lower frame stand 22 is in the collapsed position (not shown), segments 16, 18 preferably are adjacent to or near the main-frame 14. Thus, preferably, the lower frame stand 22 segments 16, 18 and the main frame members 104 are in a stacked configuration (in a depth direction—perpendicular to the main-frame plane) when the lower frame stand 22 is folded.

Frame segment 16 preferably is pivotally attached to the main-frame 14 structure, such as by a lower swivel lock 26. See FIG. 3A. The lower swivel lock 26 permits frame segment 16 to swing from the extended position to the collapsed position. When the lower frame stand 22 is in the extended position, a lower swing arm safety latch system 33 further secures the first frame stand 22 in its fully extended position. The safety latch system 33 is described further below with reference to FIGS. 4A and 4B.

Frame segment 18 preferably is rotatably or pivotally attached to segment 16 such that upon extension of the frame segment 16 (such that the lower frame stand segment 16 is generally or substantially perpendicular to the main-frame 14) and extension of the frame segment 18, the cart 10 stands upright. The wheels 12, main frame members 104 and frame segments 16, 18 (for stand 22) form a base stand for cart 10. Preferably, segment 18 is rotatably coupled to segment 16 with a stand swivel lock 27, which is described further below with reference to FIG. 3A. The swivel lock 27 allows the frame segment 18 to move from the extended position (FIG. 1) to the folded or collapsed position (not fully shown) and also can secure the frame segment 18 in the extended position. In the extended position, the frame segment 18 preferably is substantially perpendicular to frame segment 16. In its collapsed position (not fully shown), segment 18 preferably is adjacent to the plane of segment 16 and both segments 16, 18 pivot to lay next to main frame bars 104 in a stacked configuration.

FIG. 2A is a side view of the off center swing hinge lock system 56 for upper framework 17. The hinge lock system 56 prohibits unintentional closure or collapse of the framework 17 from the extended position. The hinge lock system 56 includes two hinge arms, each preferably having a generally planar, elongated shape. The first hinge arm 54 and the second hinge arm 52 are rotatably coupled to each other at an arm pivot point 44. The position of arm pivot point 44 preferably is near the terminal end of the arm 52 and spaced from the terminal end of arm 54, as described further below.

The hinge lock system 56 is located between the upper framework 17 and the main-frame structure 14. More specifically, the hinge lock system 56 is located between one of the main-frame side members 104 and an adjacent upper framework side element 108. As shown in FIG. 6, in one embodiment, two hinge lock systems 56 operate on opposing frame members 108. Preferably, the same is true for swivel locks 26 and 27 and swing arm lock 33. Thus, each frame rail preferably has a lock therebetween. The first hinge arm 54 illustrated in FIGS. 2A, 2B and 2C is pivotally or hingedly attached to the side of the upper framework side element 108 by pivotal fastener 42, which could be a screw or a rivet, for example. FIG. 2B shows arm 54 on the outside of side element 108 and arm 52 on the inside of main-frame side member 104. The second hinge arm 52 is pivotally coupled to the main-frame side member 104, preferably on the inside of the side member 104 and near the upper end thereof. Preferably, the second hinge arm 52 is coupled below the upper framework 17. The term "inside" refers to a position generally inboard the rectangular main-frame members 104 in cart space 105 (FIG. 6). "Outside" refers to a position generally outboard of the side element 108, which may be inside or outside of the cart space 105.

The hinge lock system 56 has a locked position or extended off-center position (see FIG. 2B) and an unlocked and collapsed position (see FIG. 2A). In the locked position, the arm pivot point 44 for arms 52, 54 is closer to the main frame pivotal attachment 40 than when the hinge lock system 56 is in an unlocked position (FIG. 2A). In the locked position, the arms 52, 54 are extended generally linearly with respect to each other, but are over-extended beyond the longitudinal centerline of each arm 52, 54 such that the pivot 44 is spaced from a line 47a passing through the pivots 42 and 48 toward pivot 40. See deviated dashed lines which are offset from line 47a. When the hinge lock system 54 is in the unlocked and collapsed position (FIG. 2A), the arms 52, 54 are collapsed such that the pivot 44 is spaced from the line 47a on the side away from the pivot 40. Arms 52, 54 may be adjacent to one another when fully collapsed. When arm 54 and arm 52 are extended and in the locked position (FIG. 2B), the arm pivot point 44 is inboard with respect to an imaginary line 47 a through the pivotal coupling 42 and pivotal coupling 48. Couplings 42, 48 are at opposite ends of each arm 54, 52 away from arm pivot point 44. The term "inboard" means closer to the main-frame 14 than another point of reference.

Arm 54 includes a stop that prevents further rotation of the arms 52, 54 beyond the extended or locked position. In one arrangement, the stop includes a stop surface 57, which may protrude or extend from the outboard surface of the arm that contacts or abuts a corresponding stop surface, such as edge 53, of the second hinge arm 52. The stop 57 of the first hinge arm 54 can have various constructions. In one arrangement, the stop 57 is an outboard protruding or extending lip, substantially normal to the plane of the arm, on an edge of arm 54. The stop 57 could also be a pin extending outboard from the plane of arm 54, distal to side frame coupling 40. Lip stop 57 protrudes perpendicularly from the plane of arm 54 toward arm 52. The protruding lip stop 57 on arm 54 abuts or stops the edge 53 on arm 52 such that when the hinge lock system 56 is locked or extended (more properly over-extended), the lip stop 57 stops the edge 53 of the arm 52 and stops further inboard movement of pivot point 44 towards pivot coupling 40. In one embodiment, the protruding lip 57 is greater than the width or thickness of arm 52, to ensure that the arm 52 cannot bend or deflect out of proper contact with the lip 57. In another embodiment, the extension of the lip stop 57 is less than the thickness of the edge 53 so long as lip stop 57 can stop the edge 53 of arm 52 from passing therebeyond. In another embodiment, the lip-stop can be a pin or ball or rivet. It is sufficient that arm 52 is stopped by a structure on arm 54 at the off-center position of FIG. 2B. Preferably, when the cart 10 is in an upright position and upper framework 17 is extended with respect to the main-frame (see FIG. 1), arm lip stop 57 prevents the edge 53 of arm 52 from passing beyond the stop limit such that the upper framework 17 does not move when forces act in a generally downward direction on the framework 17 or generally parallel to the longitudinal plane formed by main-frame 14 (rails 104).

The arm pivot point 44 of arms 52, 54 (FIG. 2A, B) may be at various positions on the arms as long as pivot point 44 is spaced from or distal to the end 54c of arm 54 (FIG. 2C). Preferably, the edge 53 of the second swing arm 52 abuts the lip stop 57 in FIG. 2B.

In one embodiment, the arm pivot point 44 is inboard or is positioned towards frame pivot 40 such that line 47a is not aligned with the longitudinal centerlines of hinge arms 54, 52. See dashed centerlines through arms 54, 52.

As described above, the hinge arms 52, 54 preferably have an elongated planar shape. In one embodiment, the first hinge arm 54 is greater in length than the second hinge arm 52. In another embodiment, the second hinge arm 54 is the same or has a longer length than the first hinge arm 52.

The hinge lock system 56 may include a pair of complementary detents or other interference surfaces. In FIG. 2C, the pair of detents is shown as a first detent 47 on the first swing arm 54 and a complementary second detent 46 on the second hinge arm 52. Preferably, the first detent 47 is located near one end (e.g., distally located from pivot coupling 42) of arm 54 below arm pivot point 44. The detent shapes preferably are complementary (a bump or protrusion matching an indent or depression). The second swing arm detent 46 is located on arm 52 between the arm pivot point 44 and the pivotal coupling or fastener 48. The detents should engage one another when the hinge lock system 56 is locked off-center (FIG. 2B) and pivot point 44 is inboard towards frame pivot 40.

The complementary detents may have different, but complementary shapes and sizes. In one embodiment, the detent 47 of arm 54 extends or protrudes outwardly from the plane of arm 54 towards arm 52. The detent 46 of arm 52 is a complementary depression on or in arm 52. In another embodiment, the detents 46, 47 are oppositely configured such that detent 47 is a depression or hole and detent 46 is a protrusion. In both embodiments, when the hinge lock system 56 is fully extended off-center, the first detent 47 fits into the complementary second detent 46 causing arms 52, 54 to lock and further prevent the upper framework from unintentionally moving or collapsing when forces generally aligned with or parallel to a plane of the main-frame 14 act upon it. Thus, preferably, a double lock system is provided on the upper frames 17 and rails 104 with off-center lock 56 and detents 46, 47.

Figure 3A:
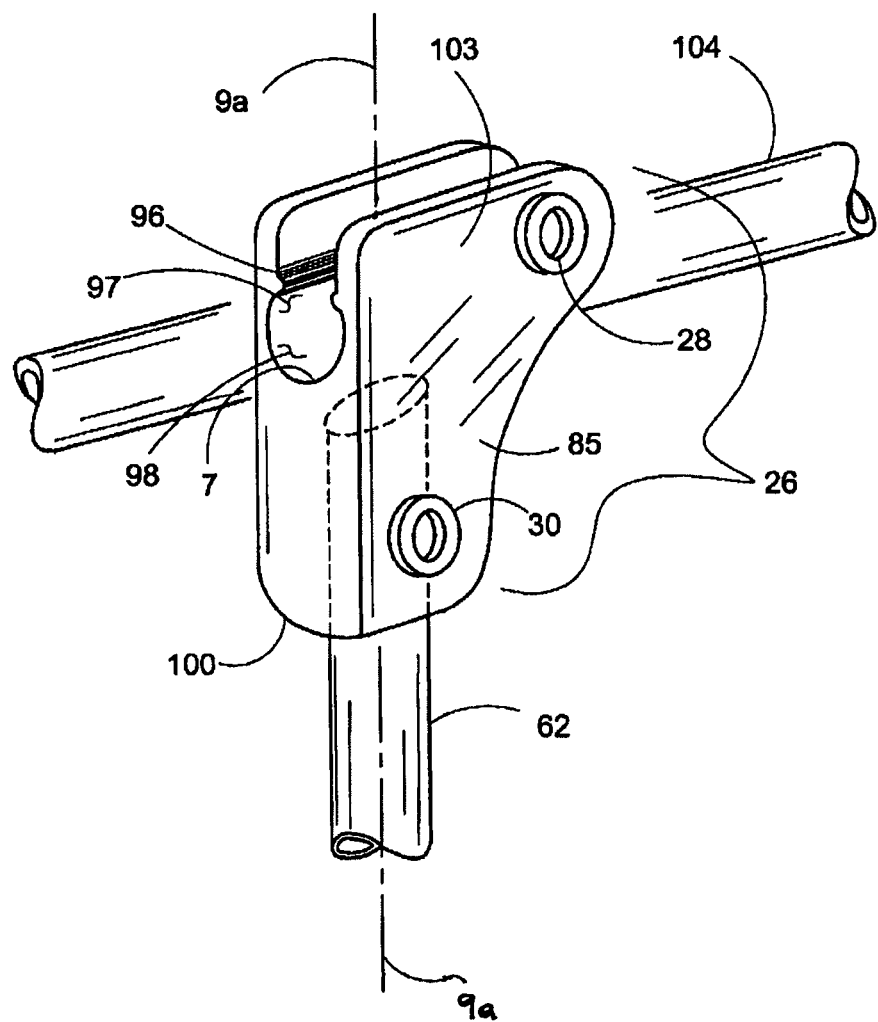
FIGS. 3A and 3B are perspective views of a lower swivel lock between the main-frame and the lower frame stand (FIG. 3A) and the lower frame stand and the frame legs (FIG. 3B).
Figure 3B:
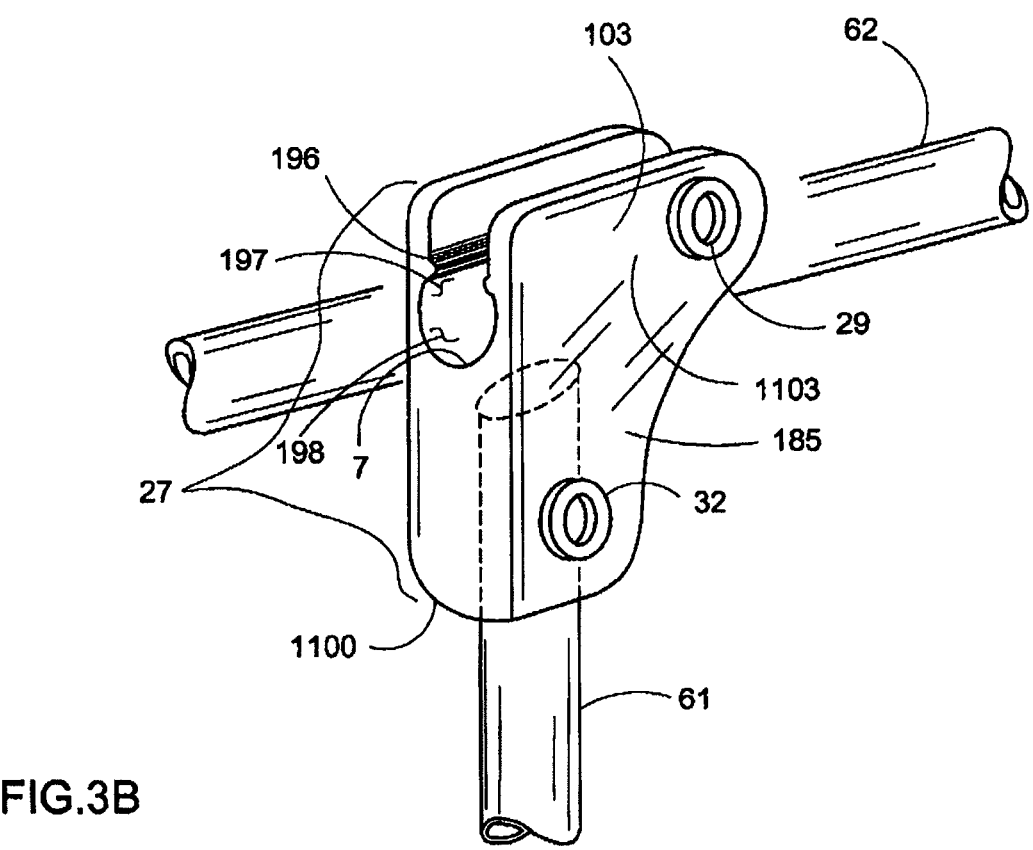

FIGS. 3A and 3B illustrate an embodiment of swivel locks 26, 27 between the main-frame and the lower frame stand (FIG. 3A) and the lower frame stand and the frame legs (FIG. 3B). Preferably, the swivel locks 26, 27 are substantially similar or identical. In the illustrated arrangement, the lower swivel lock 26 and the stand swivel lock 27 are identical except for their respective locations on the cart 10. In one of the preferred embodiments, the swivel lock 27 and swivel lock 26 are fabricated from suitable material such that they are resilient in that they are capable of enlarging or expanding outward and snap inward over the frame bars or rods, as described further below. This swivel lock material preferably is a suitable plastic, but could also be constructed of other resilient materials.

The swivel lock 26 has a body 85 and a frame channel 98 defined by channel side walls 103. The body 85 is pivotally attached to one of the main-frame side members 104 by a pivotal coupling or fastener 28. The lower swivel body 85 is attached to an adjacent first frame stand segment side support 62 by a fastener 30. The fastener 30 fixes frame bar 62 on swivel lock 26. The swing arm lock 33 (FIG. 4B) and swivel lock 26 combine to form a double lock structure for the lower frame stand 22 and the main frame rails 105.

In an embodiment, the side support 62 of the frame stand 22 is attached to the swivel lock 26 by inserting a terminal end of side support 62 into a cylindrical cavity 100 within the lower swivel body 85. A suitable fastener or coupling 30 (such as a screw or rivet) can be provided to fix the side support 62 to the swivel body 85. Preferably, the opening of the cavity 100 defines a shape that matches the shape defined by the terminal end of side support 62. The walls of cavity 100 define a shape that matches a portion of the side support 62. Once the side support 62 is inserted into the cavity 100, a fastener or coupling 92 prevents the side support 62 from moving within or being removed from the cavity 100. Other suitable arrangements, such as the use of adhesives in addition to or in the place of the fastener or coupling 92 may also be used. Preferably, the cavity 100 is positioned such that an axial centerline through the cavity 100 is generally or substantially perpendicular to an axial centerline through the swivel lock frame channel 98.

The frame channel 98 defines a shape that closely fits around side member 104. Thus, the frame bar or rail 104 can rotate into and out of the frame channel 98. The channel 98 has a longitudinal open mouth that can capture a sizable segment of the frame rail 104, which can define a length sufficient to secure the side member 104 within the channel 98 and inhibit unintentional disengagement during normal use of the cart 10. In one embodiment, the channel 98 includes at least one and, preferably, two detents 96 on either side of the wall of the frame channel 98. The detents 96 protrude or extend inboard into the frame channel 98 defining longitudinal or axial swivel channel mouth 97 and assist in retaining the side member 104 within the channel 98.

The swivel channel mouth 97 has a cross-sectional dimension or opening width that is smaller than the cross-sectional dimension (e.g., diameter) of the side rail member 104. Preferably, the size of the mouth 97 is such that when frame segment 16 is extended or unfolded with respect to the side member rail 104 (FIG. 1) and the rail 104 is in the channel 98, the detents 96 retain then rail member 104 in channel 98. In another embodiment, the channel 98 includes only one detent 96. The channel 98 may operate with no detents. However, the detents 96 advantageously provide a further lock system for the cart 10.

The detent 96 can be of various shapes and sizes. In one embodiment, each detent 96 may be elongated and extend along the longitudinal mouth of the channel 98. In other embodiments, the detent may be circular, a separate element such as a rivet, or any other shape or construction that reduces the cross sectional or width dimension of the mouth 97. Each channel-facing detent 96 is typically fabricated from material that is resilient in that they can expand and rebound or return to their original shape. Each detent 96 is sized such that when the segment 16 is rotated from the collapsed position to the extended position, a force perpendicular to an axial centerline through channel 98 (e.g., rotation of the body 85) is needed to cause side member 104 to expand the detent(s) 96 slightly outboard, moving the sidewalls or channel 98 to allow the main-frame side rail member 104 to enter or leave channel 98. Once side rail member 104 is in channel 98, the detent(s) 96 rebound inboard to their original shape or position, thereby securing or locking the frame rail member 104 into the channel 98. To rotate the side rail member 104 from the extended or locked position to the collapsed position, a force perpendicular to an axial centerline through channel 98 (e.g., rotation of the body 85) must be applied to cause the main-frame side rail member 104 to expand the channel 98 and move the detent(s) 96 slightly to allow the rail member 104 to pass through channel mouth 97 and the detent(s) 96.

The stand swivel lock 27 illustrated in FIG. 3B preferably is substantially similar or identical to the swivel lock 26 described above. The swivel lock 27 of FIG. 3B has a body 185 and a frame channel 198 defined by channel side walls 1103. The body 185 is pivotally attached to one of the side frame supports 62 by a pivotal fastener or coupling 29. A fastener or coupling 32, or other suitable coupling arrangement, fixes the stand swivel body 185 to an adjacent second frame stand segment side leg 61.

In one preferred embodiment, the second frame stand segment side leg 61 is attached to the stand swivel lock 27 by inserting a terminal end of side leg 61 into a cavity 1100 within the stand swivel body 185 and fixing the side leg 61 to the body 185 with a fastener 32, or other suitable coupling arrangement. The opening of the cavity 1100 defines a shape that closely matches the shape defined by terminal end of the side leg 61. The interior walls of the cavity 1100 define a shape that closely matches a portion of the terminal end of side leg 61. Once the side leg 61 is inserted into the cavity 1100, fastener or coupling 32 prevents movement of the side leg 61 within the cavity 1100. The cavity 1100 is positioned such that an axial centerline through the cavity 1100 is generally perpendicular to an axial centerline through frame channel 198.

The channel 198 defines a shape that can closely fit around the first frame stand side support 62. In one embodiment, the channel 198 includes two detents 196. The detents 196 are positioned on either side of channel 198 and protrude inboard from the plane of the walls of the frame channel 198 to define a stand swivel channel mouth 197.

Channel mouth 197 has a cross-sectional dimension or opening width that is smaller than the cross-sectional dimension (e.g., diameter) of the side support 62. The size of the channel mouth is such that when the frame segment 18 (FIG. 1) is extended with respect to the first stand frame segment 16 and support bar 62 is positioned in the channel 198, the detents 196 retain the frame support 62 in the channel 198. In another embodiment, the channel 198 includes only one detent 196. Alternatively, the channel 198 may have no detents.

The detents 196 may have various shapes and sizes. Detent 196 may be elongated and run along the channel. The detent 196 may be a circular bump or ridge or a rivet, a pin, or any other shape or construction that reduces the cross-sectional dimension of the mouth 197. The detent(s) 196 preferably are resilient in that they can compress and rebound to its original shape. The detent(s) 196 preferably are sized such that when the frame segment 16 is rotated from the collapsed position to the extended position, a force perpendicular to an axial centerline through channel 198 (e.g., rotation of the body 185) is needed to cause the support 62 to expand the channel by acting against the detent(s) 196 to allow the side support 62 to pass the detent(s) 196 and move into the channel 198.

Once the first frame stand segment side support 62 is located in the channel 198, the detent(s) 196 rebound to their original shape, thereby locking the side support 62 into the channel 198. To rotate the side support 62 from the extended position to the collapsed position, a force perpendicular to an axial centerline through the channel 198 (e.g., rotation of the body 185) is applied to cause the side support 62 to compress the detent(s) 196 slightly to allow the side support 62 to pass the detent(s) 196.

Figure 4A:
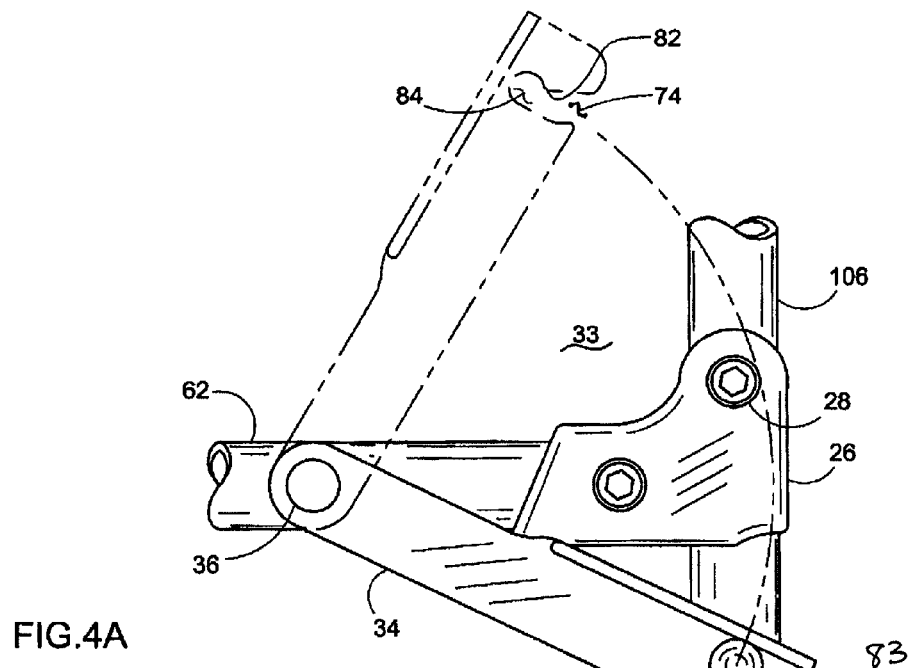
FIG. 4A is a side view of a lower swing arm safety latch system, in the locked position (solid line), that attaches the first frame stand side supports to the main-frame side members (the unlocked position shown in phantom lines).

FIG. 4A illustrates a side view of an embodiment of the lower swing arm safety latch system 33. In the unlocked position (dashed line), the latch 33 permits the first stand frame segment 16 to fold relative to the main-frame 14. In the locked position (solid line), the latch 33 secures the frame side supports 62 to frame main members 104 and inhibits or prevents unintentional folding of the first stand frame segment 16 relative to the main-frame 14. In one embodiment, two swing latch systems 33 operate on the opposing side rail bars 104.

Preferably, the latch system 33 includes an elongated latch swing arm 34 with a latch capture mouth 74 at one end thereof. The other end of arm 34 is pivotally mounted, such as by a pivotal fastener 36, to one of the first frame stand side supports 62. The latch system 33 also includes a pin 72 on frame rail bar 104, as described further below.

The capture mouth 74 of the swing arm 34 is defined by a latch tooth 82. The latch tooth 82 extends inboard into mouth 74. One embodiment has the tooth 82 inboard towards the pivotal fastener 36. The tooth 82 decreases the cross sectional dimension of the capture mouth 74 and defines a capture throat 84. The capture throat 84 is distal or inboard with respect to the capture mouth 74. The swing arm 34 cooperates with latch pin 72. The latch pin 72 on frame rail bar 104 is sized and positioned so that when the swing arm 34 is swung from the unlocked position (phantom line FIG. 4A) to the locked position (solid line in FIG. 4A), the arm 34 swings and the latch pin 72 passes though the capture mouth 74 into locking throat 84.

The pin 72 can have various different shapes and can be located on different positions on the cart 10 (above or below lock 26) as long as the swing arm 34 is capable of engaging the pin 72. In one embodiment, the pin 72 is located on the inside of the lower portion of an adjacent frame bar side rail member 104. In another embodiment, the latch pin 72 is located outside of the main-frame side rail support 104. In one embodiment, the pin 72 can be positioned below the swivel lock 26, and in another embodiment the pin 72 can be located above the swivel lock 26.

Figure 4B:
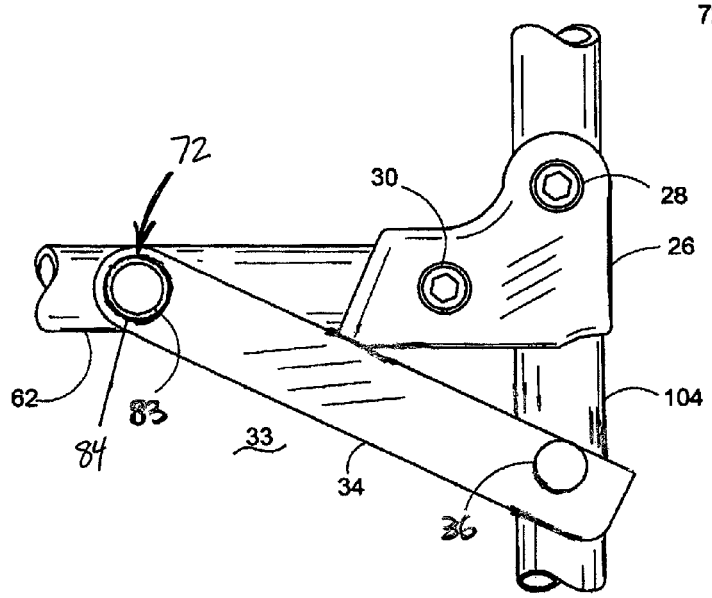
FIG. 4B is a side view of a modification of the lower swing arm safety latch system of FIG. 4A. The safety latch system of FIG. 4B is illustrated in the locked position.

In the illustrated arrangement of FIG. 6, the pin 72 protrudes or extends inward from the side member 104 toward the opposing side rail member 104 (inboard with respect to cart space 105). The pin 72 preferably has a stem portion that is received by the mouth 74 of the arm 34, and has an enlarged cap portion 83 (FIG. 4B). The cap portion 83 is at the outer end of the stem portion. The swing latch arm 34 is rotatably attached on the same side of side support 62 (e.g., the inboard side) as latch pin 72. The pin 72 is positioned such that upon pivotal movement of the swing arm 34 to the locked or closed position, the arm 34 swings, and capture mouth 74 and the capture throat 84 accepts and retains the stem portion of the pin 72. In the locked position, the latch swing arm 34 secures frame segment 16 of stand 22 (FIG. 6) in the extended position with respect to the plane of the main-frame 14 and inhibits or prevents unintentional folding of the frame segment 16.

The lower swivel lock 26 rotatably attaches the first frame stand side support bar 62 to the main-frame side rail member 104. Preferably, the swivel lock 26 is somewhat resilient in that it is compressible and returns to its original shape. In one arrangement, at least a small amount of compression is possible along the longitudinal centerline 9a-9a (FIG. 3A) of frame support bar 62 which is part of frame stand 16 (FIG. 6). The compressive force is generally perpendicular or normal to the frame channel 98 and the channel side segment 7 (FIG. 3A) generally is subjected to the greatest compressive force during the latching operation. For the latch pin 72 to pass the tooth 82 and be retained in the throat 84 (FIG. 4A), the latch swing arm 34 typically generates at least a slight compressive force during the locking operation wherein the compressive force is normal to an axial centerline through swivel lock channel 98 such that the force compresses the lower swivel body 85 at the channel side 7. When the stand segment 22 is extended and the latch system 33 is in the locked position, the stand segment 22 does not collapse or fold when longitudinal forces, parallel to the longitudinal axis or plane of the main-frame 14, act upon stand segment 22. The application of compressive force to the channel face 7 provides tactile feedback to the user that the stand segment 22 is in locked by the swing arm lock 33.

FIG. 4B illustrates a modification of the safety latch system 33 of FIG. 4A. The safety latch system 33 of FIG. 4B is shown in the locked position. The safety latch system 33 of FIG. 4B is pivotally coupled to the side rail member 104. The latch pin 72 is provided on the first frame stand side support bar 62. Instead of a capture throat, the arm 34 of FIG. 4B includes a preferably completely enclosed, enlarged opening 84 that is larger than the cap portion 83 of the pin 72. The arm 34 can be flexed slightly in an inboard or inward direction (away from the bar 62 and pin 72) such that the end of the arm 34 can be passed over the pin 72 until the opening 84 can be passed over the cap portion 83 of the pin 72. The arm 34 is then locked to the first frame stand side support bar 62 to inhibit or prevent unintentional folding of the first stand frame segment 16 relative to the main-frame 14. With respect to either of the configurations of FIG. 4A and FIG. 4B, the pivot 36 can be positioned on either of the first stand frame segment 16 or the main-frame 14 and the latch pin 72 can be positioned on the other of the first stand frame segment 16 and the main-frame 14.

FIG. 5A illustrates a side view of the cart 10 oriented for use as a table. In this position, the main-frame structure 14 is positioned horizontally with respect to the ground surface or plane 1. The upper framework side elements 108 (of upper frame 17, FIG. 6) and the first frame stand segment side supports 62 (of lower stand 16, FIG. 6) act as the legs for the table. The panel 20 acts as a substantially flat area onto which items can be placed.

FIG. 5B illustrates a side view of the cart 10 in an upright position. The main-frame 14 is substantially vertical with respect to the ground plane or surface 1. The second frame stand side legs 18 provide one element of support and wheel system 12 provides the other element for the base of the cart. In this position, items can be placed onto the lower or first stand frame segment 16. In one embodiment, a padded or cushioned sleeve 38 surrounds cross frame member 15 and provides comfort to the user when he or she uses the cart 10. A user can grasp sleeve 38 of main-frame cross member 15 and use the cart to carry items between different locations.

The wheel system 12 can have various different configurations. The wheel system 12 is rotatably mounted near the bottom portions of side frame members 104. The wheel system 12 preferably is of sufficient width and height to allow the cart to be pulled over soft sand when the device is loaded. In one embodiment, the wheel system 12 is a pair of wheels including a left wheel 66 and a right wheel 68 rotatably attached near a terminal end of each of side members 104. The wheels 66, 68 are attached to one another and to the main-frame 14 by an axle 70. The axle 70 is rotatably supported by and extends between the side rail members 104 at a point of attachment 71, which can be located below the swing latch pin 72. The axle 70 closes rectangular cart space 105. The wheels 66, 68 preferably are attached to the outside of side rail members 104. In another embodiment, the wheels 66, 68 can be rotatably mounted to side rail members 104 of the structure 14 using pivotal couplings or fasteners without an axle 70. In another embodiment, the wheel system 12 includes a single cylindrical roller rotatably attached near a terminal end of each of opposing side members 104. In other arrangements, the cart 10 may have more than two wheels, such as three or four wheels, for example.

In one embodiment, the main-frame 14 has a panel 20 that covers the cart space 105 formed by left and right main-frame rail members 104 and cross bar member 15. In one embodiment, two opposing sides of the panel 20 are fixed to the main-frame 14. The panel 20 can be positioned in the cart space 105 generally between lower stand swivel 26 and pivotal fastener or coupling 48. The panel 20 can be made of various different materials. For example, the panel 20 can be a cloth panel, a rigid panel, or a flexible panel. If the panel 20 is cloth or a flexible material, the panel can be attached to the main-frame by sewing the panel 20 onto the main-frame structure 14 or creating a pair of pockets along the sides of the panel 20 that can receive the side rails 104. The panel 20 may also be fabricated from any material that is suitable to act as a surface for a table, such as plastic or composite materials. In another embodiment, the cart 10 has no panel 20 in space 105.

With reference to FIG. 1, the cart 10 includes a mesh bag, pouch or container 23, which can be attached to the outside or rear surface of the panel 20, or elsewhere on the cart 10. The pouch 23 forms a receptacle to store miscellaneous items, such as beach towels or cups. The pouch 23 can be sewn onto surface of the flexible panel 20 or attached by any other suitable method. In one embodiment, a strap or elongated strip of material 24 can be attached near the bottom portions of the flexible panel 20. The strap 24 can be fabricated from leather, rope, bungee cord material or any other material suitable for tying items. Fastening material, such as hook and loop fasteners, can be used on the strap 24 to permit the strap 24 to be secured around the side rails 104.

Preferably, the upper framework 17 is attached near the upper portion of the main-frame structure 14. The framework 17 can be made of several elements or struts. Framework bars or rods can have various different cross-sectional shapes and sizes. In one embodiment, upper framework 17 can be U-shaped, wherein a rigid cross bar element 109 is at the terminal ends of upper framework side elements 108 and defines a U-shape. In another preferred embodiment, the framework elements can define a shape substantially similar to the letter H with one or more intermediate cross bar members. Multiple cross members can span the upper framework 17 space. The terminal ends of side elements 108 rotatably attach to upper portions of the side rail members 104 by a suitable pivotal fastener or coupling 40.

In one embodiment, the upper framework 17 and/or the main-frame structure 14 can have an upper auxiliary cross member 41 (FIG. 6) that extends between opposing side members 108 and/or 104, preferably between cross member 15 and panel 20. The upper frame rails 108 (three rails 108 forming a U-shape) are illustrated as being partly broken away to show (i) left frame rail bar 108 and (ii) cross member 41. In the illustrated arrangement, the cross member 41 is coupled to the upper framework 17. However, in another arrangement, the terminal ends of the auxiliary cross member 41 are attached to side rail members 104. The rail elements 108 are rotatably attached to the rails 104. Auxiliary cross member 41 can be fabricated from material similar to the other frame bar members. A bag or pouch 41a can be provided, and can hang from the cross rail piece 41. In another embodiment, the cross rail member 41 can be attached above or below the rail elements 108.

The lower frame stand 22 can be pivotally attached to lower portions of the main-frame structure 14 by the swivel lock 26. In one embodiment, two lower swivel locks 26 operate on opposing frame rail members 104. The frame stand 22 includes the frame segment 16, which is pivotally attached to frame segment 18 by stand swivel lock 27. When the lower frame stand 22 is unfolded or extended, the cart 10 is able to stand upright.

The lower frame segment 16 may include several supports or struts. The support bars can have various different cross-sectional shapes and sizes. In one embodiment, the segment 16 can be generally U-shaped, wherein a rigid first cross support 64 is at a terminal end of opposing side frame supports 62 defining the U-shape. The supports 64 can also define the shape of a letter H with cross bars or can define a square or rectangle. The segment 16 can also include a cross support 58 extending between opposing side supports 62 between first cross support 64 and lower swivel lock 26. In another embodiment, the segment 16 only has one cross support.

The first frame stand 22 may also include auxiliary supports or frame elements 60. The auxiliary supports 60 can be long thin bars made from tubular steel or other metallic composites. However, the auxiliary supports 60 can be made from any material suitable for providing support. In one embodiment, a plurality of auxiliary elements or supports 60 span from cross bar supports 64, 58 between side supports 62. In another embodiment, the auxiliary supports or members 60 can span the side supports 62 between the cross bar supports 64, 58. In yet another embodiment, the auxiliary supports 60 can be positioned to define a shape of a cross with the ends of the supports 60 attaching to the cross supports 64, 58 and the side supports 62.

Stand leg segment 18 is rotatably or pivotally attached to the first frame stand 16 by the stand swivel 27. Segments 16, 18 define lower stand 22. In one embodiment, two swivel locks 27 operate on opposing side supports 62. The leg segment 18 can be made from several elements or pieces. Like the other frame pieces, the bars forming second frame stand frame segment 18 can have various different cross-sectional shapes and sizes.

In one embodiment, leg stand segment 18 can be U-shaped, wherein a rigid cross support 25 is the terminal ends of opposing rigid side legs 61 defining a U-shape. In another embodiment, opposing side legs 61 and cross bar 25 can be arranged to define an H-shape or can define a square or a rectangle. In another embodiment, leg segment 16 has opposing side frame legs 61 with no cross bar support.

When the cart 10 is in the upright position as in FIG. 6 and FIG. 1, leg segment 18 is fully extended (to an L-position) or substantially perpendicular with respect to stand segment 16, and segment 16 is fully extended (to an L-position) or substantially perpendicular with respect to main-frame structure 14. The auxiliary support legs 60 provide physical support to leg segment 16 when longitudinal forces generally parallel to the longitudinal axis or plane of the main-frame 14 act upon frame stand 22.

With reference to FIG. 1, a bungee cord or suitable strap 50 can be attached to the upper auxiliary cross member 41 and which may be used to secure articles to the cart 10. Preferably, the distance or height spanned by the strap 50 is sufficient to receive commonly-sized foldable chairs, such as foldable beach chairs, in a folded orientation. For example, the height is at least about two and one-half feet and can be at least about three feet. The height can be between two and one-half feet and three and one-half feet. In some arrangements, the space between the lower frame segment 16 and the upper framework 17 is substantially open, or at least free of any rigid frame members, such that hanging items (e.g., folded chairs) can be accommodated in the space between the segment 16 and the upper framework 17.

Figure 7:
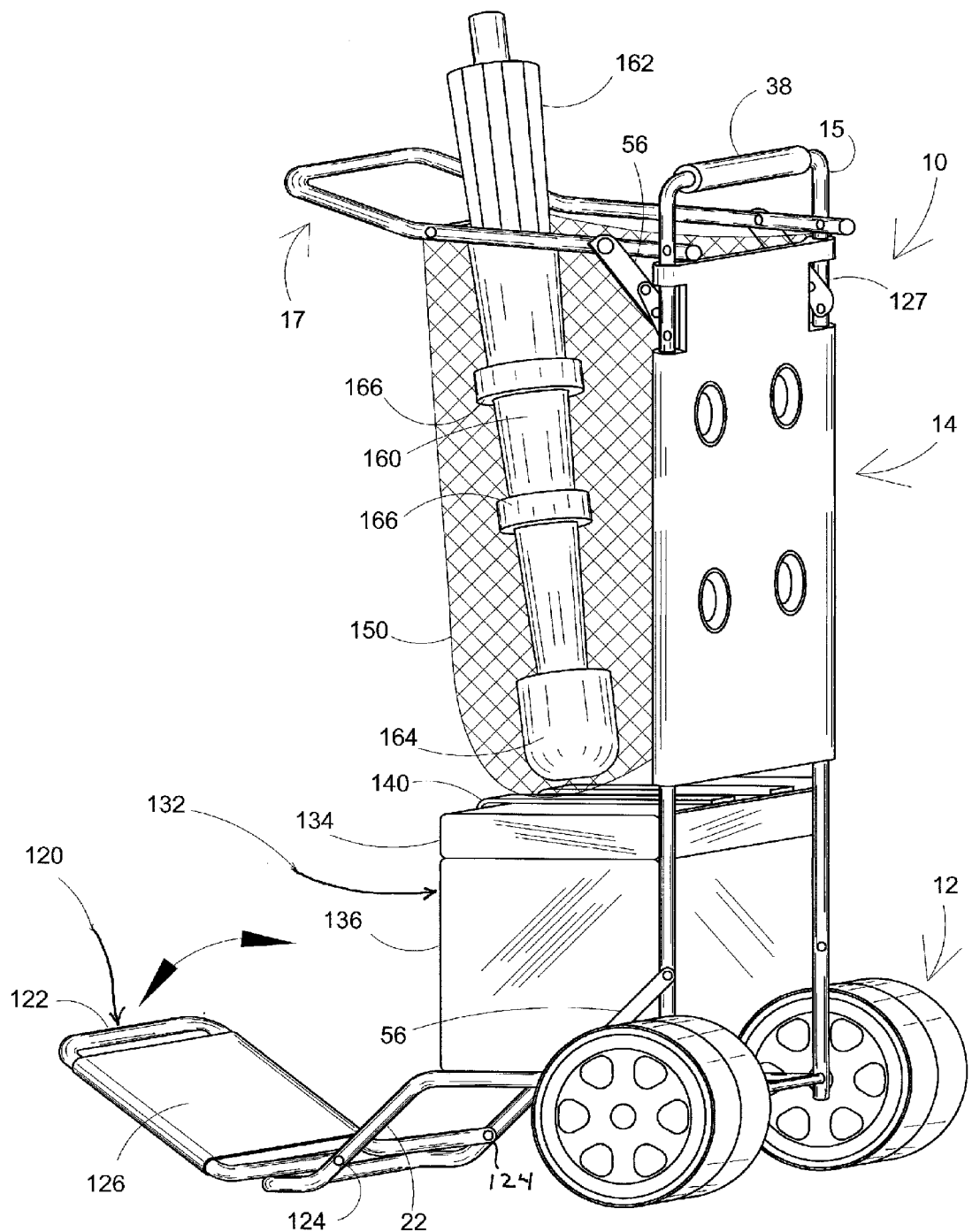
FIG. 7 is a side view of a modification of the cart shown and described with respect to FIGS. 1-6.
Figure 8:
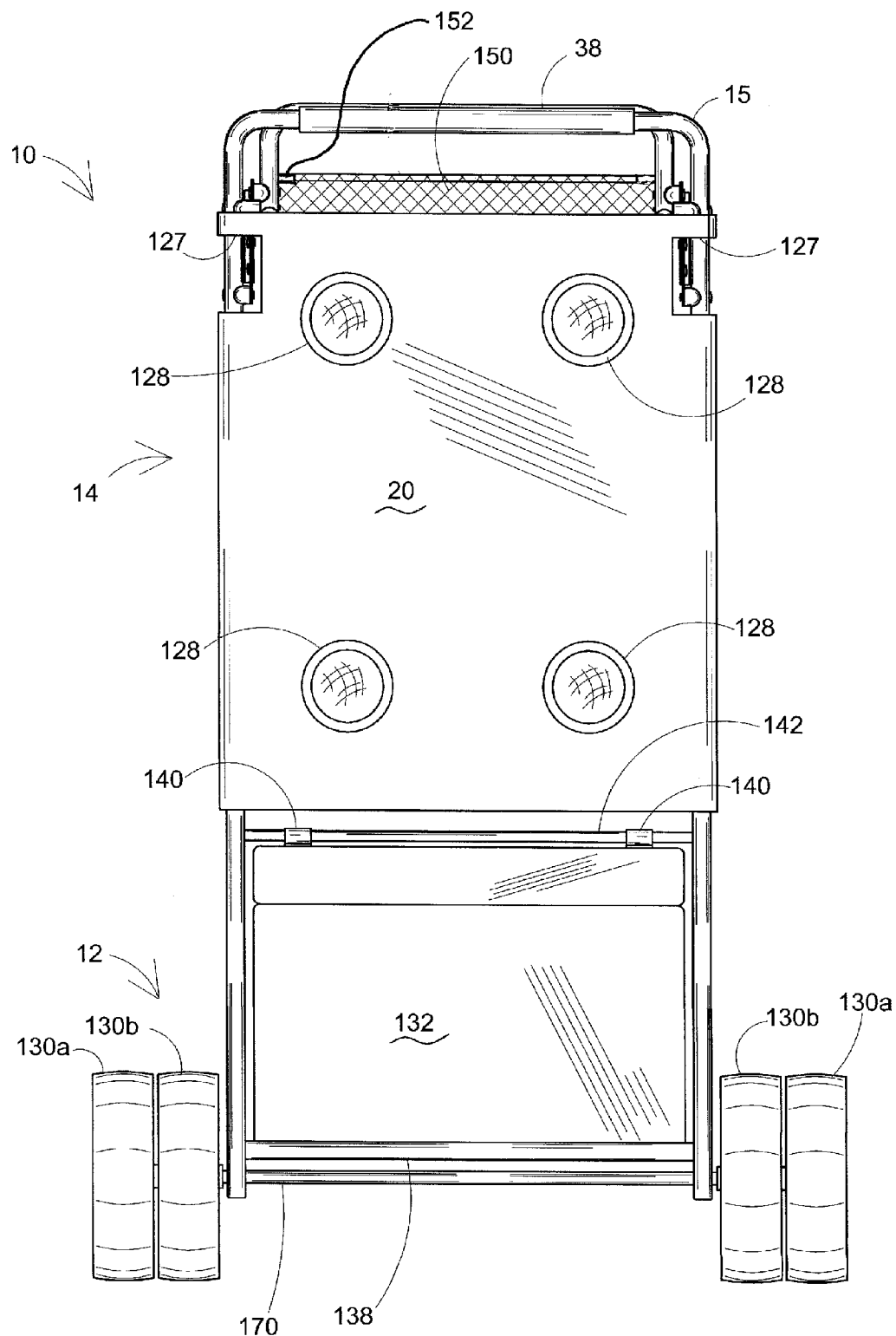
FIG. 8 is a rear view of the cart of FIG. 7.

FIGS. 7 and 8 illustrate a modification of the cart 10 described above with reference to FIGS. 1-6. The cart 10 of FIGS. 7 and 8 is similar in many respects to the cart 10 described in connection with FIGS. 1-6. Accordingly, the same reference numerals used above are used in connection with FIGS. 7 and 8 to refer to the same or corresponding components. In addition, unless described otherwise, components of the cart 10 in FIGS. 7 and 8 can be similar or identical to the same or corresponding components of the cart 10 in FIGS. 1-6.

With reference to FIGS. 7 and 8, the cart 10 includes a frame having a main-frame portion 14 that extends in a generally vertical direction (as oriented in FIGS. 7 and 8) and, preferably, is generally planar such that the cart 10 can be used in a table mode, as described above. The main-frame 14 can be of any suitable material or construction, such as those described above. In one arrangement, the main-frame 14 is constructed of tubular metal elements. The frame also includes a first or lower frame stand 22 and a second or upper framework or frame stand 17. The upper frame stand 17 and the lower frame stand 22 preferably are foldable, or pivotally connected, relative to the main-frame 14. The upper frame stand 17 and lower frame stand 22 can be of any suitable construction, but in one arrangement is also constructed of tubular metal elements. Preferably, when folded, the upper frame stand 17 and lower frame stand 22 do not overlap one another. That is, preferably, the length of the main-frame 14 is greater than the combination of the length of the upper frame stand 17 and the lower frame stand 22.

Preferably, each frame stand 17, 22 includes at least one locking mechanism, and preferably a pair of locking mechanisms, that selectively secure the frame stands 17, 22 in an unfolded or extended position relative to the main-frame 14, as shown. Preferably, one locking mechanism is provided on each side of each frame stand 17, 22 to engage a respective side of the main-frame 14. In one embodiment, the locking mechanism is an off center swing hinge lock system 56 as described above with reference to the upper framework 17 and FIGS. 1 and 2A-2C.

In one embodiment, the upper frame stand 17 and the lower frame stand 22 are identical or substantially identical in size and shape, thereby reducing the number of unique parts required to manufacture the cart 10. In addition, substantially similar or identical frame stands 17, 22 assist in providing a relatively flat upper surface of the cart 10 in the table mode. Preferably, each frame stand 17, 22 is substantially U-shaped when viewed from above or below the cart 10. Free ends of the U-shaped frame stands 17, 22 are pivotally coupled to the main-frame 14. In some arrangements, the free end portion of the frame stands 17, 22 lie within a first plane and the end portion of the U-shaped frame stands 17, 22 lie within a second plane that is angled relative to the first plane. Thus, when assembled to the main-frame 14 and in an unfolded, extended or open position, the closed end portion of the frame stands 17, 22 extend outwardly (away from one another or up and down, respectively, in FIG. 7). This shape provides stability when the frame stands 17, 22 are used as table legs. In addition, the lower frame stand 22, along with wheel assembly 12, can support the cart 10 in a generally upright orientation without requiring an additional frame element (such as segment 18 in FIGS. 1-7). The angled portion of the upper frame stand 17 keeps hanging items (such as folded chairs) on the frame stand 17 when the cart 10 is upright. As described above, preferably, the space between the upper frame stand 17 and the lower frame stand 22 is generally free of frame members of the cart 10. More preferably, the vertically-extending space between the upwardly and downwardly angled portions of the respective upper frame stand 17 and lower frame stand 22 is free from rigid frame elements such that this space can be utilized for items (e.g., folded chairs) hanging from the upper frame stand 17. Preferably, the distance or height between the upper frame stand 17 and lower frame stand 22 is sufficient to receive commonly-sized foldable chairs, such as foldable beach chairs, in a folded orientation. For example, the height is at least about two and one-half feet and can be at least about three feet. In some arrangements, the height can be between two and one-half feet and three and one-half feet.

In some embodiments, the cart 10 includes a lower frame stand extension 120, which is often referred to herein as a "body board support" because it is well-suited for supporting body boards commonly used for surfing waves in a prone position. However, this term is used without limitation, because the extension 120 may be useful for a variety of other purposes.

The body board support 120 includes a frame, which preferably is a generally U-shaped frame member 122 that is pivotally coupled to the lower frame stand 22 by a pair of pivots 124. The pivots 124 may be of any suitable structure, including rivets, pins, bolts or other similar arrangements. Preferably, in an extended, open or unfolded position, the body board support 120 extends in a forward direction (away from the main-frame 14) from the lower frame stand 22. A stop arrangement can be provided to establish the unfolded position of the support 120, which can simply be contact between surfaces of the frame member 122 and the lower frame stand 22. Other stop arrangements or locking arrangements, including those described herein, can also be used in either the folded or unfolded (extended) positions. The body board support 120 is foldable toward the main-frame 14 to a folded or stowed position, in which it preferably nests within the lower frame stand 22. That is, in some arrangements the exterior lateral dimension of the frame member 122 is smaller than the interior lateral dimension of the lower frame stand 22 such that the body board support 120 can reside generally within the interior space of the lower frame stand 22. Other objects (such as the optional integrated cooler—described below) may interfere with the complete folding of the body board support 120. Accordingly, a "folded" position of the body board support 120 may refer to an intermediate position short of a completely folded position.

Advantageously, because the body board support 120 preferably extends beyond the upper and lower frame stands 17, 22, body boards (or other items) can be accommodated by the support 120 even in the presence of hanging items (e.g., folded chairs) on the upper frame stand 17, thereby increasing the carrying capacity and packing efficiency of the cart 10. Preferably, the body board support 120 includes a support surface 126 that extends between opposing sides of the frame 122. In the illustrated arrangement, the support surface 126 is defined by a panel, such as fabric, cloth or plastic panel, which extends entirely across the space between the opposing sides of the frame 122. In some arrangements, the panel is a fabric panel that encircles the frame 122, or had side pockets that each receive one of the side rail portions of the frame 122, in a manner similar to the panel 20 described above with reference to FIGS. 1-6. If desired, a cord or strap (such as bungee cord 50) can be provided to extend between the upper frame stand 17 and the lower frame stand 22 or body board extension 120 to assist in retaining carried items in place on the cart 10.

Preferably, a handle 15 is provided at the upper end of the main-frame 14, which may be defined by a cross-bar member of the main-frame 14. The handle 15 may include an optional cushion member 38. The handle 15 may be a closed end, or bottom portion, of a U-shaped main-frame 14, but could also be constructed from another element above, below, in front of, or behind the upper end of the main-frame 14.

A panel 20 preferably extends between opposing sides of the main-frame 14 and at least a substantial portion of the length of the main-frame 14. In the illustrated arrangement, an upper end of the panel 20 extends above the locking mechanism 56 and includes cut-out portions 127 to accommodate a portion of the locking mechanism 56 that connects to the main-frame 14. Thus, the length of the panel 20 can be increased relative to the panel 20 illustrated in FIGS. 1-6. The panel 20 may be of any suitable construction, such as those described above with reference to FIGS. 1-6, for example. In some arrangements, the panel 20 is a fabric panel the wraps around the main-frame 14 or includes lengthwise-extending side pockets that receive respective side rail portions of the main-frame 14. In other arrangements, the panel 20 can be constructed of plastic or another suitable material (e.g., wood or metal) and be fixed to the main-frame 14 by any suitable fastening arrangement or fasteners, such as rivets or screws. The panel 20 can include optional cup holders 128, which can be of any suitable construction. In one arrangement, the cup holders 128 include mesh body portions extending forward (downward when cart 10 is oriented in a table mode) from openings in the panel 20 and sized and shaped to receive commonly-sized drink containers. In the illustrated arrangement, four optional cup-holders 128 are provided near corners of the panel 20; however other numbers or locations of the optional cup-holders 128 can be used.

The wheel system 12 preferably includes multiple individual wheels 130 on each side of the main-frame 14. In the illustrated arrangement, two wheels 130a, 130b are provided on each lateral side of the main-frame 14. The wheels 130 of each side include an outboard wheel 130a and an inboard wheel 130b, preferably both of which are rotatably supported on the same axle 70. The axle 70 can be supported by the main-frame 14 (or other frame portion) and extend completely, laterally through the main-frame 14 such that all four wheels (or any additional wheels) are all supported on the same axle 70 for rotation about a single axis. In alternative arrangements, separate axle portions can be provided on each side of the main-frame 14, each of which supports a pair of wheels 130a, 130b.

The provision of multiple wheels 130a, 130b on each side of the cart 10 increases the footprint of the cart 10 to decrease the weight carried by each wheel 130 for a given load, thus making the cart 10 less likely to sink into soft surfaces, such as sand, with a given load. Moreover, the provision of multiple wheels 130 on each side of the cart 10 increases the effective footprint of the cart 10, without the disadvantages of very wide single wheels. For example, the separate wheels 130a, 130b maintain the ability of the cart 10 to be easily stowed, because when removed, each individual wheel 130 is smaller in width and can be stored in less overall height than comparably thicker wheels. Thus, preferably, the individual wheels 130a, 130b are separable from one another. However, in other arrangements, the wheels 130a, 130b can be secured to one another, if desired. In addition, it is simpler and, quite possibly, more economical to produce multiple thinner wheels than a single wheel of twice the width.

In some arrangements, the wheels 130 can be secured to the axle 170 by a cooperating groove and circlip or spring-type cotter pin arrangement (not shown). The groove can be defined by the axle 170 and the outboard wheel 130a can carry a spring-type cotter pin that is capable of engaging opposing sides of the groove. Preferably, the cotter pin is secured to the outboard wheel 130a such that is movable between an engaged and disengaged position, without being removed or easily removable from the wheel 130a. The groove of the axle 170 is located such that when the wheels 130a, 130b are placed on the axle 170, the cotter pin is aligned with the groove and can be moved to the engaged position to secure the wheels 130a, 130b onto the axle 170. The wheels 130a, 130b can be quickly and easily removed by moving the cotter pin to the disengaged position, wherein it preferably remains engaged with the wheel 130a so that it does not get misplaced and is ready for subsequent use.

In some embodiments, the cart 10 can include an optional and, preferably, removable container or cooler unit 132. Preferably, the cooler unit 132 is sized and shaped to fit generally in a corner between the main-frame 14 and one of the frame stands 17, 22 (preferably, the lower frame stand 22). The cooler unit 132 may be generally square or rectangular in shape in all cross-sectional directions. However, other shapes may also be used. In a preferred arrangement, the cooler unit 132 is specially sized and shaped for use with the cart 10 and is sold in a kit along with the cart 10 or as a specific accessory for the cart 10. The cooler unit 132 can be of any suitable construction including any suitable material or combination of materials. In one arrangement, the cooler unit 132 can have a lid portion 134 and a body portion 136. The lid portion 134 can be selectively opened or closed relative to the body portion 136 by any suitable arrangement, such as a zipper closure. Moreover, when stowed in the cart 10, the lid portion 134 can face forward, rearward, upward or any other direction. However, rearward or forward placement can permit access even when the cart is carrying other objects.

Preferably, the cooler unit 132 rests on the lower frame stand 22, which may include one or more additional cross-supports 138 (FIG. 8). Furthermore, preferably, the cooler unit 132 can be positioned between the side rails of the main-frame 14. Preferably, the cooler unit 132 does not extend significantly beyond the horizontal planar portion of the frame stand 22. That is, it does not extend significantly into the space above the angled, closed end portion of the frame stand 22, wherein the cooler unit 132 could interfere with hanging items. Moreover, preferably, a rearward end of the cooler unit 132 does not extend significantly beyond the main-frame 22 such that it does not interfere with the use of the cart 10. The cooler unit 132 can be secured to the frame of the cart 10, such as the main-frame 14 and/or frame stands 17, 22, by any suitable arrangement. In the illustrated arrangement, one or more straps 140 can be provided to loop around various frame members of main-frame 14, frame stands 17, 22 or other frame portions. For example, the main-frame 14 can include a lower cross-member or cross-support 142 that the straps 140 can be looped around to secure the cooler unit 132 in place. Preferably, the cooler unit 132 is sized to fit generally below the cross-member 142.

In some arrangements, the cart 10 can include a container 150 supported by the frame of the cart 10, such as by the main-frame 14 and/or the upper frame stand 17, for example. The container 150 can be separate from or connected to the panel 20. In one embodiment, the container 150 is supported at its upper end by one or more cross-members 152 of the main-frame 14 and/or upper frame stand 17. Two spaced-apart cross-members 152 may be provided to normally hold the container 150 with its upper end open for easy loading and unloading of the container 150. A lower end of the container 150 may also be secured to the main-frame 14 and/or panel 20 so that the container 150 is generally held in place when the cart 10 is used in the table mode.

Preferably, the container 150 occupies a space generally between the horizontal, planar free-end portions of the upper and lower frame stands 17, 22. If the optional cooler unit 132 is provided or contemplated for use with the cart 10, the container 150 can occupy a space above the cooler unit 132 and below the upper frame stand 17. Thus, with such an arrangement, the container 150 provides useful storage space without interfering with hanging items, items stored on the body board support 120 or the cooler unit 132. The container 150 can be constructed of any suitable material or combination of materials. In one arrangement, the container 150 is constructed as a mesh bag, or includes one or more mesh panel portions to permit viewing of the contents of the container 150, to permit items within the container 150 to air dry and to allow easy cleaning of the container 150. Moreover, preferably, the container 150 is collapsible when empty so that the upper frame stand 17 can be folded toward or within the main-frame 14.

The cart 10 can include an elongated item holder 160, which can be used to carry any of a variety of poles or other elongated items. Preferably, the holder 160 is well-suited for carrying one or more umbrellas and, more preferably, a beach umbrella 162. The holder 160 may be incorporated or integrated with the container 150, or can be a partially or entirely separate component of the cart 10. In the illustrated arrangement, the holder 160 includes a lower pocket 164 and one or more (preferably two) upper loops or straps 166. The lower pocket 164 can support one end of the umbrella 162 (or other object) and the loops or straps 166 secure an intermediate portion of the umbrella 162 (or other object).

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present light duty cart has been described in the context of particularly preferred embodiments, the skilled artisan will appreciate, in view of the present disclosure, that certain advantages, features and aspects of the cart may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A foldable light duty cart, comprising:
    a main-frame structure including opposing rigid main-frame side frame members with at least one rigid main-frame cross bar member extending between the main-frame side members;
    a wheel system rotatably mounted near a respective bottom portion of each of the main-frame side members;
    a panel attached to and extending between the main-frame side members, the panel being sufficiently rigid to function as a table top surface when the main-frame structure is in a generally horizontal orientation;
    an upper frame stand which is pivotally attached to the main-frame side members, including opposing rigid upper frame stand side frame elements and at least one rigid upper frame stand cross bar element extending between the upper frame stand side frame elements;
    a lower frame stand which is pivotally attached to the main-frame side members, including opposing rigid lower frame stand side frame elements and at least one rigid lower frame stand cross bar element extending between the lower frame stand side frame elements;
    a lower swivel lock having body, a frame channel and channel side walls, the body pivotally attached to one of the main-frame side frame members and fixedly attached to an adjacent one of the lower frame stand side frame elements, the frame channel capturing the main-frame side frame member therein when the lower frame stand is substantially perpendicular to the main-frame side frame member in an extended position, and, when the main-frame side frame member is not captured in the frame channel, the lower frame stand is capable of moving to a collapsed position near the main-frame side frame member;
    an upper lock system between one of the main-frame side frame members and an adjacent one of the upper frame stand side frame elements, the upper lock system configured to selectively secure the upper frame stand in an extended position relative to the main-frame structure such that a load can be supported by the upper frame stand when the cart is in an upright position;
    a lower lock system between one of the lower frame stand side frame elements and an adjacent one of the main-frame side frame members, the lower lock system configured to selectively maintain the lower frame stand side frame element in an extended position with respect to the main-frame structure;
    wherein the channel side walls define two inwardly-extending detents on opposing sides of the frame channel to capture the mainframe side frame member within the frame channel.

2. The foldable light duty cart of claim 1, wherein at least one of the upper lock system and the lower lock system comprises a first hinge arm pivotally coupled to one of the upper frame stand side frame element and the lower frame stand side frame element at a first pivot and a second hinge arm pivotally coupled to the main-frame side frame member at a second pivot;
    the first and second hinge arms pivotally coupled to one another at an arm pivot point;
    the first hinge arm having a stop and the second hinge arm having an edge, the stop contacting the edge and forming an off center hinge lock when the first and second hinge arms are in a locked position and the arm pivot point being inboard with respect to an imaginary line through first and second pivots.

3. The foldable light duty cart of claim 2, wherein the first hinge arm includes a first detent, the second hinge arm includes a second detent complementary to the first detent, wherein the first and second detent engage one another in the locked position.

4. The foldable light duty cart of claim 1, wherein the lower swivel lock comprises a soft lock wherein the lower swivel channel side walls are resilient, and the frame channel defines a channel mouth which is smaller than a cross-sectional dimension of the main-frame side members such that in the extended position, the main-frame side member is locked into the frame channel.

5. The foldable light duty cart of claim 1, wherein the cart has a container attached to the panel.

6. The foldable light duty cart of claim 1, wherein the upper frame stand has a collapsed position in which the upper frame stand side frame elements are rotated to a position generally adjacent to the main-frame side frame members, and the lower frame stand has a collapsed position in which the lower frame stand side frame elements are rotated to a position generally adjacent to the main-frame side frame members.

7. A light duty cart, comprising:
   a frame, comprising a substantially planar main-frame portion that extends in a generally vertical direction when the cart is in an upright position;
   a handle located at an upper portion of the main-frame portion;
   a wheel set located at a lower portion of the main-frame portion;
   an upper foldable frame portion, which is pivotally mounted to the upper portion of the main-frame portion and has an unfolded position, wherein, in the unfolded position, the upper foldable frame portion is generally perpendicular to the main-frame portion, the upper foldable frame portion is movable from the unfolded position toward the main-frame portion;
   at least one upper locking mechanism that selectively locks the upper foldable frame portion in the unfolded position, the locking mechanism comprising a first lock arm and a second lock arm, the first lock arm pivotally coupled to the main-frame portion at a first pivot and the second lock arm pivotally coupled to the upper foldable frame portion at a second pivot, the first lock arm and the second lock arm coupled to one another at an arm pivot, wherein the first lock arm and the second lock arm fold about the arm pivot in a first direction to permit the upper foldable arm to move from the unfolded position toward the main-frame portion, the first lock arm and the second lock arm fold about the arm pivot in a second direction to a locked position, wherein arm pivot is spaced from a line passing through the first pivot and the second pivot in the locked position, wherein the locking mechanism comprises a stop that prevents the first lock arm and the second lock arm from folding in the second direction beyond the locked position;
   a lower frame stand which is pivotally attached to the main-frame portion, including opposing rigid lower frame stand side frame elements and at least one rigid lower frame stand cross bar element extending between the lower frame stand side frame elements;
   a lower swivel lock having body, a frame channel and channel side walls, the body pivotally attached to one of the main-frame portion and fixedly attached to an adjacent one of the lower frame stand side frame elements, the frame channel capturing the main-frame portion therein when the lower frame stand is substantially perpendicular to the main-frame portion in an extended position, and, when the main-frame portion is not captured in the frame channel, the lower frame stand is capable of moving to a collapsed position near the main-frame portion;
   wherein the channel side walls define two inwardly-extending detents on opposing sides of the frame channel to capture the mainframe portion within the frame channel.

8. The light duty cart of claim 7, wherein the wheel set comprises a first pair of individual wheels on a first lateral side of the main-frame portion and a second pair of individual wheels on a second lateral side of the main-frame portion opposite the first side.

9. The light duty cart of claim 8, wherein each of the first pair of individual wheels and the second pair of individual wheels are rotatable about a single axis of rotation.

10. The light duty cart of claim 7, further comprising an umbrella holder supported by the main-frame portion, the umbrella holder comprising a lower pocket and at least one strap spaced above, and generally aligned with, an open upper end of the lower pocket.

11. The light duty cart of claim 10, wherein a generally open space is defined between the upper foldable frame portion and the wheel set, which is substantially free of any elements of the frame of the cart, such that hanging items can be supported by the upper foldable frame portion and occupy a portion of the open space.

12. The light duty cart of claim 10, further comprising a panel supported by the main-frame portion and extending along a substantial length of the main-frame portion, the panel being sufficiently rigid to permit use as a table top when the cart is used in a table mode, in which the panel is oriented in a generally horizontal direction.

13. The light duty cart of claim 12, wherein the upper foldable frame portion and the lower frame stand comprise respective upper and lower frame stands that are of a substantially similar U-shaped construction such that the upper and lower foldable frame portions can act as support legs when the cart is used in the table mode.

14. The light duty cart of claim 10, further comprising a cooler unit that is supported by the lower foldable frame stand.

15. The light duty cart of claim 14, wherein the cooler unit is removable from the cart.

16. The light duty cart of claim 14, further comprising a container supported by the cart above the cooler unit, an upper end of the container being located proximate the upper foldable frame portion.

17. A foldable light duty cart, comprising:
   a main-frame structure including opposing rigid main-frame side frame members with at least one rigid main-frame cross bar member extending between the main-frame side members;
   a wheel system rotatably mounted near a respective bottom portion of each of the main-frame side members;
   an upper frame stand which is pivotally attached to the main-frame side members, including opposing rigid upper frame stand side frame elements and at least one rigid upper frame stand cross bar element extending between the upper frame stand side frame elements;
   a lower frame stand which is pivotally attached to the main-frame side members, including opposing rigid lower frame stand side frame elements and at least one rigid lower frame stand cross bar element extending between the lower frame stand side frame elements;
   a lower swivel lock having body, a frame channel and channel side walls, the body pivotally attached to one of the main-frame side frame members and fixedly attached to an adjacent one of the lower frame stand side frame elements, the frame channel capturing the main-frame side frame member therein when the lower frame stand is substantially perpendicular to the main-frame side frame member in an extended position, and, when the main-frame side frame member is not captured in the frame channel, the lower frame stand is capable of moving to a collapsed position near the main-frame side frame member;

an upper lock system between one of the main-frame side frame members and an adjacent one of the upper frame stand side frame elements, the upper lock system configured to selectively secure the upper frame stand in an extended position relative to the main-frame structure such that a load can be supported by the upper frame stand when the cart is in an upright position;

a lower lock system between one of the lower frame stand side frame elements and an adjacent one of the main-frame side frame members, the lower lock system configured to selectively maintain the lower frame stand side frame element in an extended position with respect to the main-frame structure;

wherein the channel side walls define two inwardly-extending detents on opposing sides of the frame channel to capture the mainframe side frame member within the frame channel.

* * * * *